(12) United States Patent
Williams et al.

(10) Patent No.: US 7,597,355 B2
(45) Date of Patent: Oct. 6, 2009

(54) AIRBAG CUSHIONS WITH OPTIONAL VENTING FOR OUT-OF-POSITION CONDITIONS

(75) Inventors: Jeffrey D. Williams, Roy, UT (US);
Larry D. Rose, South Weber, UT (US);
Bradley W. Smith, Ogden, UT (US);
Michael P. Jordan, South Weber, UT (US); Patrick D. Jamison, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 155 days.

(21) Appl. No.: 11/589,316

(22) Filed: Oct. 27, 2006

(65) Prior Publication Data
US 2007/0216146 A1 Sep. 20, 2007

Related U.S. Application Data

(63) Continuation-in-part of application No. 11/528,266, filed on Sep. 27, 2006, and a continuation-in-part of application No. 11/528,118, filed on Sep. 27, 2006, and a continuation-in-part of application No. 11/528,265, filed on Sep. 27, 2006, and a continuation-in-part of application No. 11/296,031, filed on Dec. 12, 2005, and a continuation-in-part of application No. 10/959,256, filed on Oct. 6, 2004, now Pat. No. 7,347,450, and a continuation-in-part of application No. 10/959,386, filed on Oct. 6, 2004, now Pat. No. 7,012,390, and a continuation-in-part of application No. 10/832,843, filed on Apr. 27, 2004, now Pat. No. 7,237,802.

(51) Int. Cl.
*B60R 21/30* (2006.01)
(52) U.S. Cl. .................................. 280/739; 280/743.2
(58) Field of Classification Search .................. 280/739, 280/743.2, 740, 741
See application file for complete search history.

(56) References Cited

U.S. PATENT DOCUMENTS

| 5,016,913 A | 5/1991 | Nakajima et al. |
| 5,172,933 A | 12/1992 | Strasser |
| 5,246,250 A | 9/1993 | Wolanin et al. |
| 5,280,953 A | 1/1994 | Wolanin et al. |
| 5,306,043 A | 4/1994 | Mihm et al. |

(Continued)

FOREIGN PATENT DOCUMENTS

DE 19640322 9/1996

(Continued)

OTHER PUBLICATIONS

Search Report and Written Opinion concerning the Corresponding International Application No. PCT/US05/27255.

(Continued)

*Primary Examiner*—Faye M. Fleming
(74) *Attorney, Agent, or Firm*—Sally J Brown; Stoel Rives LLP

(57) ABSTRACT

An airbag cushion is disclosed for use in automotive protective systems. The airbag cushion includes at least one closeable vent for re-directing gas out of the cushion when an obstruction is encountered.

16 Claims, 18 Drawing Sheets

U.S. PATENT DOCUMENTS

| | | |
|---|---|---|
| 5,350,188 A | 9/1994 | Sato |
| 5,405,166 A | 4/1995 | Rogerson |
| 5,421,607 A | 6/1995 | Gordon |
| 5,492,363 A | 2/1996 | Hartmeyer et al. |
| 5,494,314 A | 2/1996 | Kriska et al. |
| 5,603,526 A | 2/1997 | Buchanan |
| 5,931,497 A | 8/1999 | Fischer |
| 6,056,318 A | 5/2000 | Braunschadel |
| 6,095,557 A | 8/2000 | Takimoto et al. |
| 6,126,196 A | 10/2000 | Zimmerman |
| 6,139,048 A | 10/2000 | Braunschadel |
| 6,183,003 B1 | 2/2001 | Matsuhashi et al. |
| 6,206,408 B1 | 3/2001 | Schneider |
| 6,247,726 B1 | 6/2001 | Ryan |
| 6,290,257 B1 | 9/2001 | Bunce et al. |
| 6,371,509 B1 | 4/2002 | Ellerbrok et al. |
| 6,398,258 B2 | 6/2002 | Hamada et al. |
| 6,631,921 B1 | 10/2003 | Drossler et al. |
| 6,631,922 B2 | 10/2003 | Hess et al. |
| 6,648,371 B2 | 11/2003 | Vendely et al. |
| 6,746,045 B2 | 6/2004 | Short et al. |
| 6,773,027 B2 | 8/2004 | Bohn et al. |
| 6,773,030 B2 | 8/2004 | Fischer |
| 6,832,778 B2 | 12/2004 | Pinsenschaum et al. |
| 6,863,304 B2 | 3/2005 | Reiter et al. |
| 6,918,613 B2 | 7/2005 | Short et al. |
| 6,932,385 B2 | 8/2005 | Hawthorn et al. |
| 6,971,671 B2 | 12/2005 | Schneider et al. |
| 7,059,634 B2 | 6/2006 | Bossecker et al. |
| 7,083,191 B2 | 8/2006 | Fischer |
| 7,083,192 B2 | 8/2006 | Fischer et al. |
| 7,210,702 B2 | 5/2007 | Soderquist |
| 7,237,802 B2 | 7/2007 | Rose et al. |
| 7,261,319 B2 | 8/2007 | DePottey et al. |
| 7,328,915 B2 | 2/2008 | Smith et al. |
| 7,347,450 B2 | 3/2008 | Williams, et al. |
| 7,360,789 B2 | 4/2008 | Bito |
| 7,364,192 B2 | 4/2008 | Braun et al. |
| 2003/0020266 A1 | 1/2003 | Vendely et al. |
| 2003/0020268 A1 | 1/2003 | Reiter et al. |
| 2003/0057691 A1 | 3/2003 | Tokita et al. |
| 2003/0127839 A1 | 7/2003 | Jenkins |
| 2003/0209895 A1 | 11/2003 | Gu |
| 2003/0214125 A1 | 11/2003 | Schneider et al. |
| 2004/0012179 A1 | 1/2004 | Pinsenschaum et al. |
| 2004/0056459 A1 | 3/2004 | Kassman et al. |
| 2004/0090054 A1 | 5/2004 | Bossecker et al. |
| 2004/0130135 A1 | 7/2004 | Ekdahl |
| 2004/0188990 A1 | 9/2004 | Short et al. |
| 2004/0256842 A1 | 12/2004 | Breed |
| 2005/0052008 A1 | 3/2005 | Rose et al. |
| 2005/0098990 A1 | 5/2005 | Pinsenschaum et al. |
| 2005/0236822 A1 | 10/2005 | Rose et al. |
| 2005/0248137 A1 | 11/2005 | Delventhal et al. |
| 2006/0071461 A1 | 4/2006 | Williams et al. |
| 2006/0071462 A1 | 4/2006 | Smith et al. |
| 2006/0151979 A1 | 7/2006 | DePottey et al. |
| 2006/0197327 A1 | 9/2006 | Maripudi et al. |
| 2006/0202454 A1 | 9/2006 | Parizal et al. |
| 2007/0052222 A1 | 3/2007 | Higuchi et al. |
| 2007/0108750 A1 | 5/2007 | Bauer et al. |
| 2007/0126218 A1 | 6/2007 | Schnieder et al. |
| 2007/0126219 A1 | 6/2007 | Williams |
| 2007/0132222 A1 | 6/2007 | Thomas et al. |
| 2007/0205590 A1 | 9/2007 | Klinkenberger et al. |
| 2008/0007038 A1 | 1/2008 | Fischer et al. |
| 2008/0018086 A1 | 1/2008 | Ford et al. |
| 2008/0023950 A1 | 1/2008 | Kalczynski et al. |
| 2008/0023959 A1 | 1/2008 | Crawford |
| 2008/0073890 A1 | 3/2008 | Williams et al. |
| 2008/0073891 A1 | 3/2008 | Rose et al. |
| 2008/0073892 A1 | 3/2008 | Rose et al. |
| 2008/0073893 A1 | 3/2008 | Schneider |
| 2008/0079250 A1 | 4/2008 | Boyle et al. |
| 2008/0303256 A1 | 12/2008 | Williams |
| 2009/0039630 A1 | 2/2009 | Schneider et al. |

FOREIGN PATENT DOCUMENTS

| | | |
|---|---|---|
| JP | 2001-158315 | 6/2001 |
| JP | 05085295 | 2/2008 |

OTHER PUBLICATIONS

Office Action issued Nov. 12, 2088 in co-pending U.S. Appl. No. 11/528,265.

Office Action issued Nov. 18, 2008 in co-pending U.S. Appl. No. 11/528,265.

Office Action issued Mar. 15, 2006 in co-pending U.S. Appl. No. 10/832,843.

Response to First Office Action filed in co-pending U.S. Appl. No. 10/832,843.

Interview Summary issued Jun. 15, 2006 in co-pending U.S. Appl. No. 10/832,843.

Notice of Allowance issued Jun. 22, 2006 in co-pending U.S. Appl. No. 10/832,843.

Request for Continued Examination filed Sep. 20, 2006 in co-pending U.S. Appl. No. 10/832,843.

Notice of Allowance issued Oct. 3, 2006 in co-pending U.S. Appl. No. 10/832,843.

Office Action issued Sep. 27, 2006 in co-pending U.S. Appl. No. 10/959,387.

Interview Summary issued Jan. 23, 2007 in co-pending U.S. Appl. No. 10/959,387.

Amendment and Response to Office Action filed Feb. 20, 2007 in co-pending U.S. Appl. No. 10/959,387.

Office Action issued May 2, 2007 in co-pending U.S. Appl. No. 10/959,387.

Amendment and Response to Office Action filed Aug. 7, 2007 in co-pending U.S. Appl. No. 10/959,387.

Notice of Allowance issued Oct. 5, 2007 in co-pending U.S. Appl. No. 10/959,387.

Office Action issued Jun. 8, 2007 in co-pending U.S. Appl. No. 11/296,031.

Amendment and Response to Office Action filed Dec. 4, 2007 in co-pending U.S. Appl. No. 11/296,031.

Office Action issued Apr. 21, 2008 in co-pending U.S. Appl. No. 11/296,031.

Amendment and Response to Office Action filed Jul. 21, 2008 in co-pending U.S. Appl. No. 11/296,031.

Office Action issued Oct. 21, 2008 in co-pending U.S. Appl. No. 11/296,031.

Preliminary Amenedment filed Mar. 10, 2005 in co-pending U.S. Appl. No. 10/959,256.

Office Action issued Nov. 15, 2006 in co-pending U.S. Appl. No. 10/959,256.

Interview Summary issued Jan. 23, 2007 in co-pending U.S. Appl. No. 10/959,256.

Amendment and Response to Office Action filed Feb. 15, 2007 in co-pending U.S. Appl. No. 10/959,256.

Office Action issued May 21, 2007 in co-pending U.S. Appl. No. 10/959,256.

Amendment and Response to Office Action filed Aug. 16, 2007 in co-pending U.S. Appl. No. 10/959,256.

Notice of Allowance issued Nov. 27, 2007 in co-pending U.S. Appl. No. 10/959,256.

Office Action issued Jan. 2, 2009 in co-pending U.S. Appl. No. 11/528,042.

Office Action issued Jul. 11, 2008 in co-pending U.S. Appl. No. 11/528,118.

Amendment and Response to Office Action filed Nov. 24, 2008 in co-pending U.S. Appl. No. 11/528,118.

Interview Summary issued Dec. 15, 2008 in co-pending U.S. Appl. No. 11/528,118.

Notice of Allowance issued Feb. 10, 2009 in co-pending U.S. Appl. No, 11/528,118.

Office Action issued Jun. 30, 2008 in co-pending U.S. Appl. No. 11/528,266.

Amendment and Response to Office Action filed Dec. 1, 2008 in co-pending U.S. Appl. No. 11/528,266.

Interview Summary issued Dec. 16, 2008 in co-pending U.S. Appl. No. 11/528,266.

Notice of Allowance issued Jan. 14, 2009 in co-pending U.S. Appl. No. 11/528,266.

Summary of Interview filed Jan. 16, 2009 in co-pending U.S. Appl. No. 11/528,266.

Office Action issued Dec. 2, 2008 in co-pending U.S. Appl. No. 11/758,419.

Office Action issued Apr. 7, 2008 in co-pending U.S. Appl. No. 11/295,953.

Office Action issued Jul. 1, 2008 in co-pending U.S. Appl. No. 11/295,953.

Amendment and Response to Office Action filed Dec. 1, 2008 in co-pending U.S. Appl. No. 11/295,953.

Office Action issued Sep. 26, 2006 in co-pending U.S. Appl. No. 11/031,394.

Interview Summary issued Jan. 23, 2007 in co-pending U.S. Appl. No. 11/031,394.

Amendment and Response to Office Action filed Mar. 26,20027 in co-pending U.S. Appl. No. 11/031,394.

Notice of Allowance issued May 7, 2007 in co-pending U.S. Appl. No. 11/031,394.

Office Action issued Jun. 25, 2007 in co-pending U.S. Appl. No. 11/031,394.

Notification of Transmittal of the International Search Report and the Written Opinion of the International Searching Authority issued Oct. 19, 2006 in International Application No. PCT/US2005/025416.

Notification of Transmittal of the International Search Report and the Written Opinion of the International Searching Authority issued Dec. 15, 2006 in International Application No. PCT/US2005/027255.

Notification of Transmittal of the International Search Report and the Written Opinion of the International Searching Authority issued Aug. 20, 2007 in International Application No. PCT/US2006/045367.

Notification of Transmittal of the International Search Report and the Written Opinion of the International Searching Authority issued Sep. 5, 2007 in International Application No. PCT/US2006/045441.

Notification of Transmittal of the International Search Report and the Written Opinion of the International Searching Authority issued Mar. 9, 2007 in International Application No. PCT/US2005/038175.

Notification of Transmittal of the International Search Report and the Written Opinion of the International Searching Authority issued Oct. 22, 2008 in International Application No. PCT/US2008/071337.

Notification of Transmittal of the International Search Report and the Written Opinion of the International Searching Authority issued Aug. 15, 2008 in International Application No. PCT/US2008/060226.

Notice of Allowance issued Apr. 2, 2009 in co-pending U.S. Appl. No. 11/295,953.

Amendment and Response to Office Action filed Apr. 20, 2009 in co-pending U.S. Appl. No. 11/296,031.

Notice of Allowance issued Mar. 23, 2009 in co-pending U.S. Appl. No. 11/528,118.

Office Action issued Mar. 19, 2009 in co-pending U.S. Appl. No. 11/528,266.

Amendment and Response to Office Action filed Apr. 21, 2009 in co-pending U.S. Appl. No. 11/758,419.

Amendment and Response to Office Action filed Mar. 16, 2009 in co-pending U.S. Appl. No. 11/528,265.

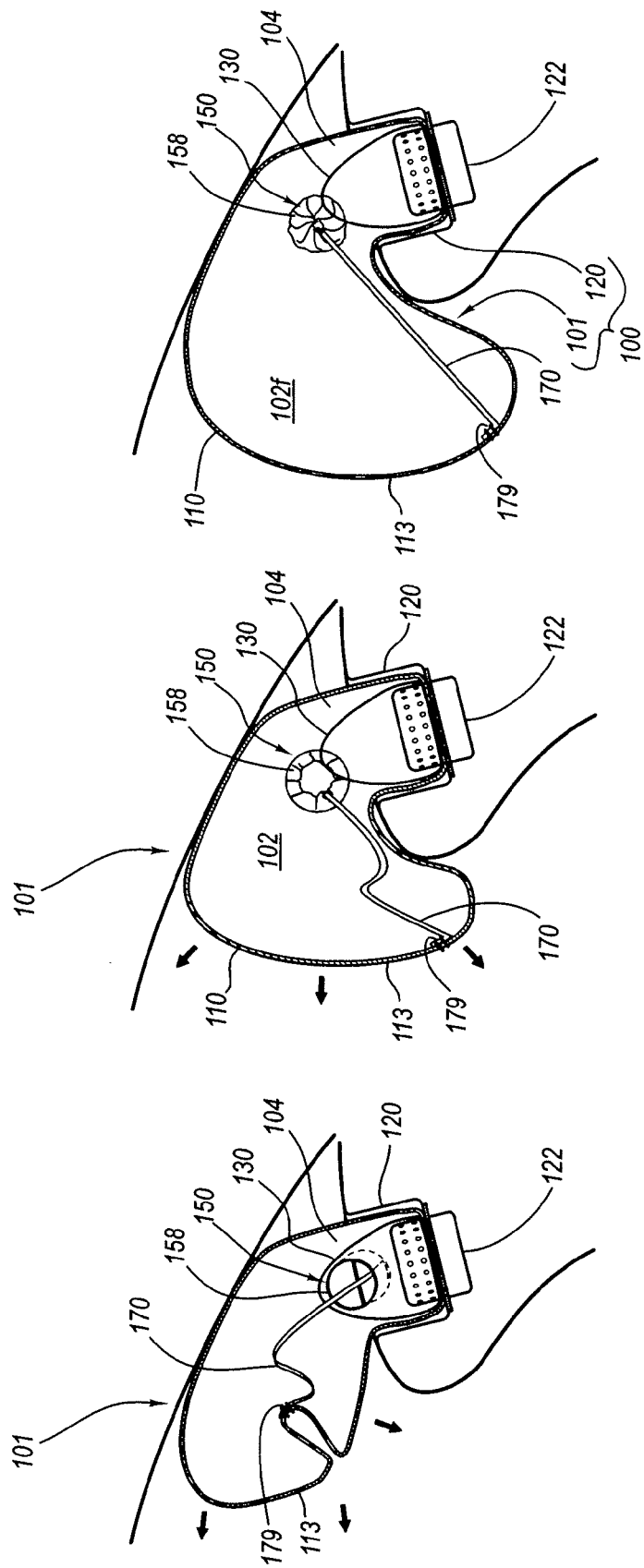

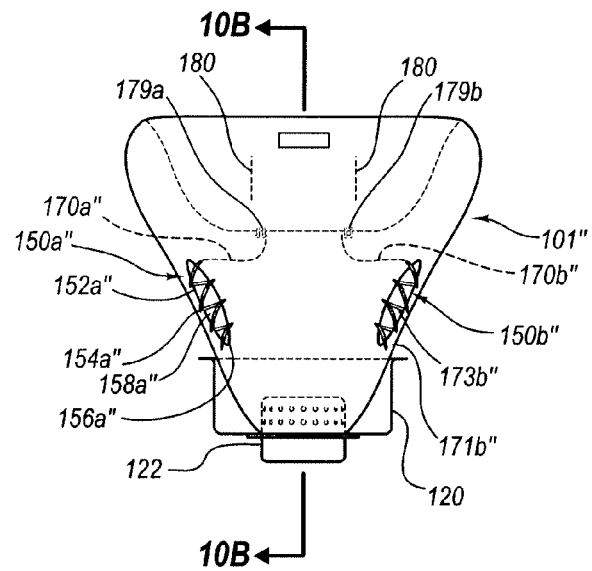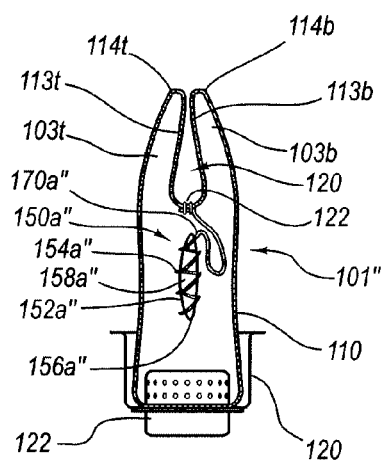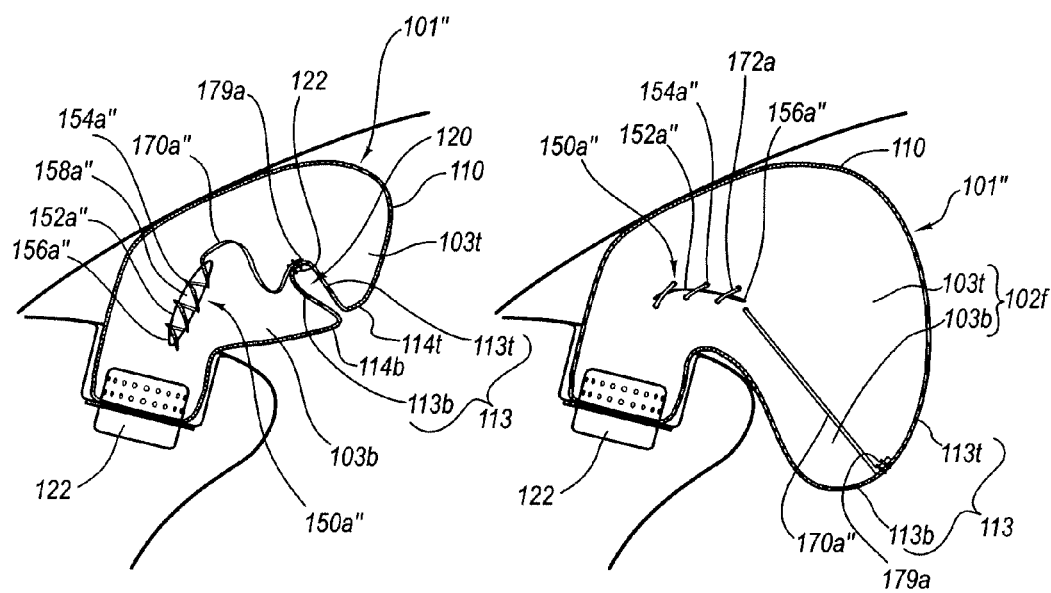
Fig. 10A
Fig. 10B
Fig. 11A
Fig. 11B

AIRBAG CUSHIONS WITH OPTIONAL VENTING FOR OUT-OF-POSITION CONDITIONS

RELATED APPLICATIONS

This application claims is a continuation-in-part of U.S. patent application Ser. No. 11/528,266 titled AIRBAG CUSHION WITH A FLAP VENT TO OPTIONALLY VENT GAS FOR OUT-OF-POSITION CONDITIONS which was filed on Sep. 27, 2006. This application is a continuation-in-part of U.S. patent application Ser. No. 11/528,118 titled AIRBAG CUSHION WITH A LACED VENT TO OPTIONALLY VENT GAS FOR OUT-OF-POSITION CONDITIONS which was filed on Sep. 27, 2006. This application is a continuation-in-part of U.S. patent application Ser. No. 11/528,265 titled PRE-FOLDED AIRBAG CUSHION WITH OPTIONAL VENTING FOR OUT-OF-POSITION CONDITIONS which was filed on Sep. 27, 2006. This application is a continuation-in-part of U.S. patent application Ser. No. 11/296,031 titled AIRBAG CUSHION WITH DIFFUSER AND CINCH TUBE TO VENT GAS FOR OUT-OF-POSITION CONDITIONS which was filed on Dec. 12, 2005. This application also is a continuation-in-part of U.S. patent application Ser. No. 10/959,256 now U.S. Pat. No. 7,347,450 titled AIRBAG CUSHION WITH VENT FOR REDUCED OUT-OF-POSITION EFFECTS which was filed on Oct. 6, 2004. This application additionally is a continuation-in-part of U.S. patent application Ser. No. 10/959,386 now U.S. Pat. No. 7,012,390 titled AIRBAG CUSHION WITH TETHER DEACTIVATED VENTING FOR REDUCED OUT-OF-POSITION EFFECTS which was filed on Oct. 6, 2004. Finally, this application is a continuation-in-part of U.S. patent application Ser. No. 10/832,843 now U.S. Pat. No. 7,237,802 titled CUSHION VENTING DESIGN FOR OUT OF POSITION OCCUPANT PROTECTION which was filed on Apr. 27, 2004. These applications are hereby incorporated by reference.

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings as listed below.

FIG. 2A is a cross-sectional view of an embodiment of a deploying airbag cushion.

FIG. 2B is a cross-sectional view of the deploying airbag cushion of FIG. 2A.

FIG. 2C is a cross-sectional view of an embodiment of a deploying airbag cushion of FIGS. 2A and 2B.

FIG. 10A is a top plan view of another embodiment of an airbag which has closeable laced vents. The airbag has its front portion folded and held in place by breakaway stitching in preparation for being further folded for placement in an automobile.

FIG. 10B is a cross-sectional view of the partially folded airbag shown in FIG. 10A with the front portion divided into a top section and a bottom section by a fold. The cross-sectional view is taken along cutting line 10B-10B in FIG. 10A.

FIG. 11A is a cross-sectional view of the airbag shown in FIGS. 10A-10B as it is deployed which shows the slack in the tether due to the fold during initial deployment.

FIG. 11B is a cross-sectional view of the airbag after it is fully deployed.

FIG. 13A is a perspective view of the partially deployed airbag cushion shown in FIG. 12A with a partial cut-away to show the open flap vent, tether and a diffuser. While FIG. 12A shows the interior of the partially deployed airbag from the front to the rear, FIG. 13A shows the interior of the partially deployed airbag from the rear to the front.

FIG. 13B is a perspective view of the partially deployed airbag cushion with a partial cut-away to show the closed flap vent, tether and a diffuser. While FIG. 12B shows the interior of the partially deployed airbag from the front to the rear, FIG. 13B shows the interior of the partially deployed airbag from the rear to the front.

Figure 1:
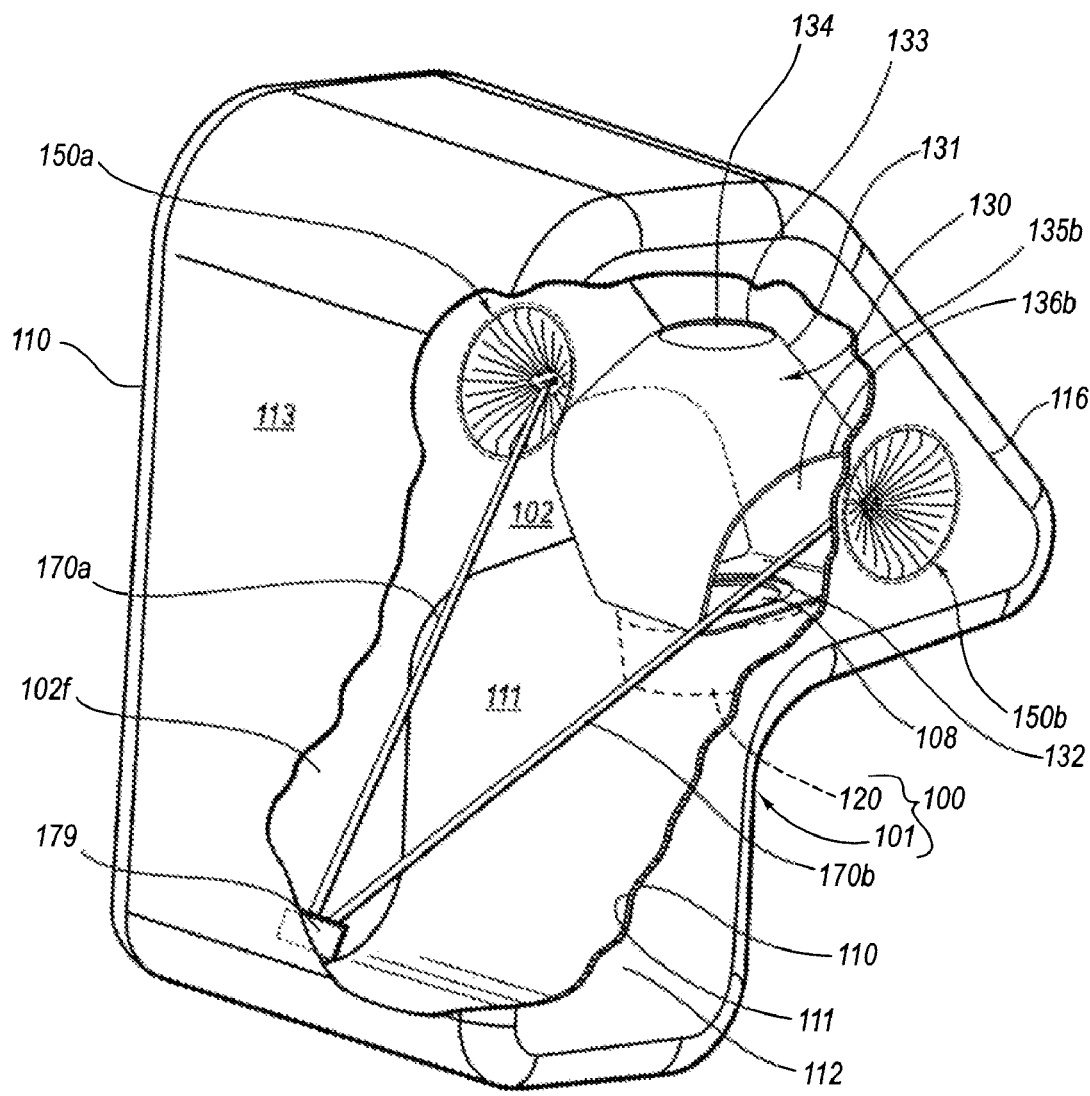
FIG. 1 is a perspective view of an airbag cushion with a partial cut-away to show the tethers, cinch vents and a diffuser.

Index of Elements Identified in the Drawings

| | |
|---|---|
| 30 | occupant |
| 40 | instrument panel |
| 60 | windshield |
| 100 | airbag module |
| 101 | airbag cushion |
| 102 | interior of the airbag cushion 101 |
| 102f | front portion of interior 102 |
| 103t | top section of front portion 102f |
| 103b | bottom section of front portion 102f |
| 108 | throat |
| 110 | membrane |
| 111 | interior surface of airbag cushion membrane |
| 112 | exterior surface of the airbag cushion membrane |
| 113 | face surface |
| 114 | tips |
| 116 | seam |
| 118 | fold |
| 119 | base of fold |
| 120 | airbag module housing |
| 122 | inflator |
| 130 | diffuser |
| 131 | material |
| 132 | opening |
| 133 | perimeter of direct opening 134 |
| 134 | direct opening of diffuser |
| 135 | side openings |
| 136 | perimeter of side openings 135 |
| 150 | cinch vent, laced vent or other closeable vent |
| 151 | rim or diameter of cinch tube and sides edges of laced vent |
| 152 | tube of cinch vent and sides of laced vent |
| 153 | tether holder of vent such as a sleeve |
| 154 | holes in tether holder of cinch vent and holes of laced vent |
| 156 | ends of laced vent |
| 158 | vent apertures |
| 160 | fixed vent |
| 170 | control tether |
| 171 | stitching or retention knot |
| 172 | stopper |
| 173 | vent portion |
| 178 | teeth |
| 179 | tether attachment |
| 180 | tack stitch |
| 200 | airbag module |
| 201 | airbag cushion |
| 202 | interior of the airbag cushion 201 |
| 202f | front portion of interior 202 |
| 203t | top section of front portion 202f |

-continued

Index of Elements Identified in the Drawings

| | |
|---|---|
| 203b | bottom section of front portion 202f |
| 208 | throat |
| 210 | membrane |
| 211 | interior surface of airbag cushion membrane |
| 212 | exterior surface of the airbag cushion membrane |
| 213 | face surface |
| 216 | seam |
| 220 | airbag module housing |
| 230 | diffuser |
| 231 | material |
| 232 | opening |
| 233 | perimeter of direct opening 134 |
| 234 | forward opening of diffuser |
| 235 | side openings |
| 236 | perimeter of side openings 135 |
| 250 | closeable flap vent |
| 251 | rim or diameter of edges of vent aperture |
| 252 | flap or flap section |
| 253 | flap attachment |
| 254 | flap opening |
| 256 | side frames of flap opening |
| 258 | vent aperture |
| 270 | control tether |
| 271 | tether holder |
| 273 | vent portion |
| 274 | fold |
| 276 | teeth |
| 278 | temporary holding feature |
| 279 | tether attachment |
| 301 | airbag cushion |
| 322 | inflator |
| 350 | vent |
| 352 | vent cover |
| 358 | vent aperture |
| 360 | fixed vent |
| 370 | control tether |
| 378 | tieback structure or temporary holding feature |

DETAILED DESCRIPTION OF PREFERRED EMBODIMENTS

Described below are embodiments of an airbag cushion and venting mechanism. As those of skill in the art will appreciate, the principles of the invention may be applied to and used with a variety of airbag deployment systems including frontal driver and passenger airbags, knee airbags, overhead airbags, curtain airbags, and the like. Thus, the present invention is applicable to airbag cushions of various shapes and sizes.

Airbag cushions are frequently located in an instrument panel and directly in front of an occupant. During a collision, an airbag cushion inflates and deploys through a cosmetic cover. The airbag cushion deploys towards the occupant and provides a restraint.

Full inflation of an airbag is not always desired. For example, partial inflation offers optimal protection when the occupant being protected by the airbag cushion is a child, a baby in a rear facing car seat or an adult positioned too close to the air bag cushion. Such conditions are referred to as out-of-position conditions. Embodiments described below provide an airbag cushion that responds to an occupant's position and vents accordingly to avoid excessive deploying impact.

Embodiments disclosed herein permit response to occupant position and vents accordingly. Each embodiment has a closeable opening for venting gas referred to as an optionally closeable vent for out-of-position (OOP) conditions such as a cinch vent or a closeable vent. Each closeable vent may be closed via a component such as a control tether or cord. Numerous embodiments of control tethers are disclosed including control tethers configured to incrementally close the vent. The tether may be connected at one end to a vent and at an opposing end elsewhere within or on the cushion. A diffuser may also be positioned in the cushion to optimize the flow of gas out of the closeable vents. It is desirable to include a diffuser in most embodiments of the cushion due to the ability of a diffuser to enable the rapid escape of the gas out of the cushion via the closeable vents.

If an occupant is in close proximity to the deploying airbag and restricts normal inflation, the closeable vent remains open and allows gas to rapidly escape. If the occupant is in a normal position and inflation is unrestricted, the tension pulls on the tether to quickly close the closeable vent. Closure retains gas for normal occupant restraint. Thus, the closeable vent may be used as a variable feature in out-of-position conditions and in normal restraint conditions. In this manner, the airbag cushion is sensitive to obstructive expansion of the cushion.

With reference now to the accompanying figures, particular embodiments of the invention will now be described in greater detail. One embodiment of airbag module 100 is shown in FIG. 1 and FIGS. 2A-2C comprising an airbag cushion 101 and a housing 120. FIG. 1 is a perspective view which shows housing 120 of airbag module 100 having an inflator 122 (not shown in FIG. 1) delivering gas into an airbag cushion 101 of airbag module 100 via a diffuser 130 within airbag cushion 101. Closeable vents 150a-b are closed as vent portions 173a-b of control tethers 170a-b have been pulled taut by expansion of the cushion due to the pressure of the gas in airbag cushion 101.

Some of the structures of the airbag cushion 101 are best seen with reference to FIGS. 1 and 2A-2C while FIGS. 3A-3C, and FIGS. 4A-4C show only some components such as diffuser 130, closeable vents 150, fixed vents 160 and tethers 170. Airbag cushion 101 has an interior 102 with front portion 102f. Airbag cushion 101 also has a membrane 110 with an interior surface 111 and exterior surface 112. Vent apertures 158 in membrane 110 provides an opening for gas to exit interior 102 of airbag cushion 101 via closeable vents 150. Gas enters interior 102 via another opening in the membrane 110, throat 108.

Optional diffuser 130 is configured to create a pressure pocket and re-direct the inflation gas to the closeable vents. The embodiment of the diffuser shown in FIG. 1 at 130 is pentagon shaped and comprises a material 131 which may be integral with a surface of cushion 101 or attached to cushion 101. For example, diffuser 130 may be sewn together with the cushion. Diffuser 130 receives gas via throat 108 through opening 132. Perimeter 133 defines direct opening 134. Direct opening 134 assists with normal inflation of cushion 101 to assist in getting cushion 101 in position in time for dynamic loading purposes. Side openings 135a (not shown in FIG. 1) and 135b are respectively defined by perimeters 136a (not shown in FIG. 1) and 136b. The gas is directed out of direct opening 134 and side openings 135a-135b. Gas directed out of side openings 135a-b is vented out of closeable vents 150a-b. Note that in other embodiments, the optional diffuser may have other shapes. For example, the diffuser may be rectangular, trapezoidal, hexagonal, round, etc. It may also have a portion which is round or elliptical while other portions are angled.

Figure 5:
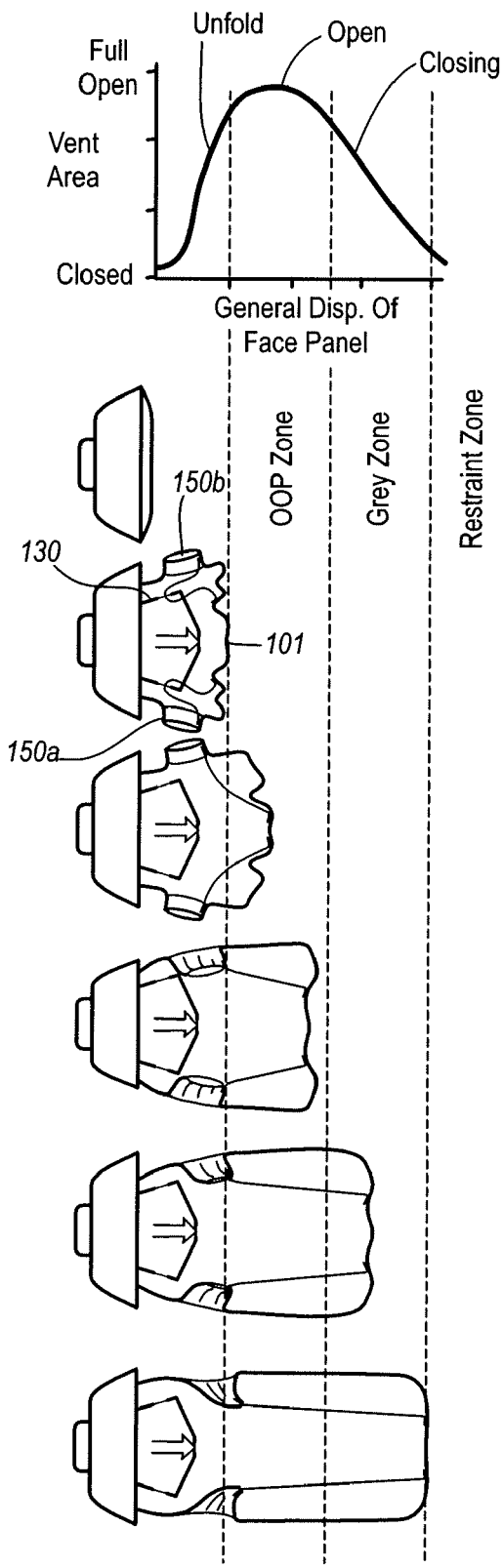
FIG. 5 is a diagram illustrating an airbag cushion venting graph in relation to an airbag cushion's deployment.

Not only are side openings 135a-b strategically located to redirect the gas flow generally toward closeable vents 150a-b and out of cushion 101 but side openings 135a-b, are also sized for optimal gas flow. Side openings 135a-b are large enough to allow most of the gas to flow through them. Only in out-of-position conditions does the focused gas flow from diffuser 130 to the aligned closeable vents 150a-b to allow a more rapid escape of the inflation gas as shown in FIG. 5.

If the occupant is in a normal position and inflation is unrestricted, diffuser 130 functions as normal to re-direct the inflation gas generally toward the vent(s). However, because diffuser 130 and closeable vents 150a-b are independent of each other, the cushion side panels can extend beyond diffuser 130 such that the flow is not aligned or focused with closeable vents 150a-b as shown in FIG. 5. This behavior helps minimize gas leakage. The large vent(s) are quickly closed as the cushion fully expands retaining gas for normal occupant restraint.

Embodiments of the closeable vent are shown in FIGS. 1-9B at 150 which are cinch vents. An additional embodiment of a closeable vent is shown in FIGS. 10A-11B at 150a" and 150b" which is referred to as a laced vent. Laced vents are also disclosed in U.S. patent application Ser. No. 11/528,118 titled AIRBAG CUSHION WITH A LACED VENT TO OPTIONALLY VENT GAS FOR OUT-OF-POSITION CONDITIONS which was filed on Sep. 27, 2006. Cinch vents and other closeable vents are also disclosed in U.S. patent application Ser. No. 11/296,031 titled AIRBAG CUSHION WITH DIFFUSER AND CINCH TUBE TO VENT GAS FOR OUT-OF-POSITION CONDITIONS which was filed on Dec. 7, 2005; U.S. patent application Ser. No. 11/295,953 titled LOCKING MECHANISM FOR A CINCH TUBE TO VENT GAS OF AN AIRBAG CUSHION which was filed on Dec. 7, 2005; U.S. patent application Ser. No. 10/959,256 titled AIRBAG CUSHION WITH VENT FOR REDUCED OUT-OF-POSITION EFFECTS which was filed on Oct. 6, 2004; U.S. patent application Ser. No. 10/959,387 titled AIRBAG CUSHION WITH TETHER DEACTIVATED VENTING FOR REDUCED OUT-OF-POSITION EFFECTS which was filed on Oct. 6, 2004; and U.S. patent application Ser. No. 10/832,843 titled CUSHION VENTING DESIGN FOR OUT OF POSITION OCCUPANT PROTECTION which was filed on Apr. 27, 2004. Other examples of closeable vents referred to as flap vents are also disclosed in U.S. patent application Ser. No. 11/528,266 titled AIRBAG CUSHION WITH A FLAP VENT TO OPTIONALLY VENT GAS FOR OUT-OF-POSITION CONDITIONS which was filed on Sep. 27, 2006. These applications are hereby incorporated by reference.

Cinch tube 150 which is described in more detail below with reference to FIGS. 7A-7B, may comprises a cinch tube 152 with a rim 151. A tether holder such as sleeve 153 with holes referred to as sleeve apertures 154 may be used to hold a vent portion 173 of tether 170. Vent aperture 158 is defined by the inner diameter of tube 152. Cinch vent 150 may be embodied with a generally cylindrical shape. The cinch tube may have any suitable shape such as rectangular, triangular, or polygon shapes. The cinch tube may be embodied with a height that is sufficient to achieve desired closure. In one embodiment, the cinch tube has height which is about half of its diameter. Selecting an appropriate height to diameter ratio permits the cinch tube to close during cinching without resistance from cushion membrane tension. The design permits the cinch tube to be a low-stress element in the cushion assembly which is helpful during unfolding of the cushion and pressurization. The cinch tube may comprise a nylon woven fabric-type or other suitable material known in the art.

Figure 6:
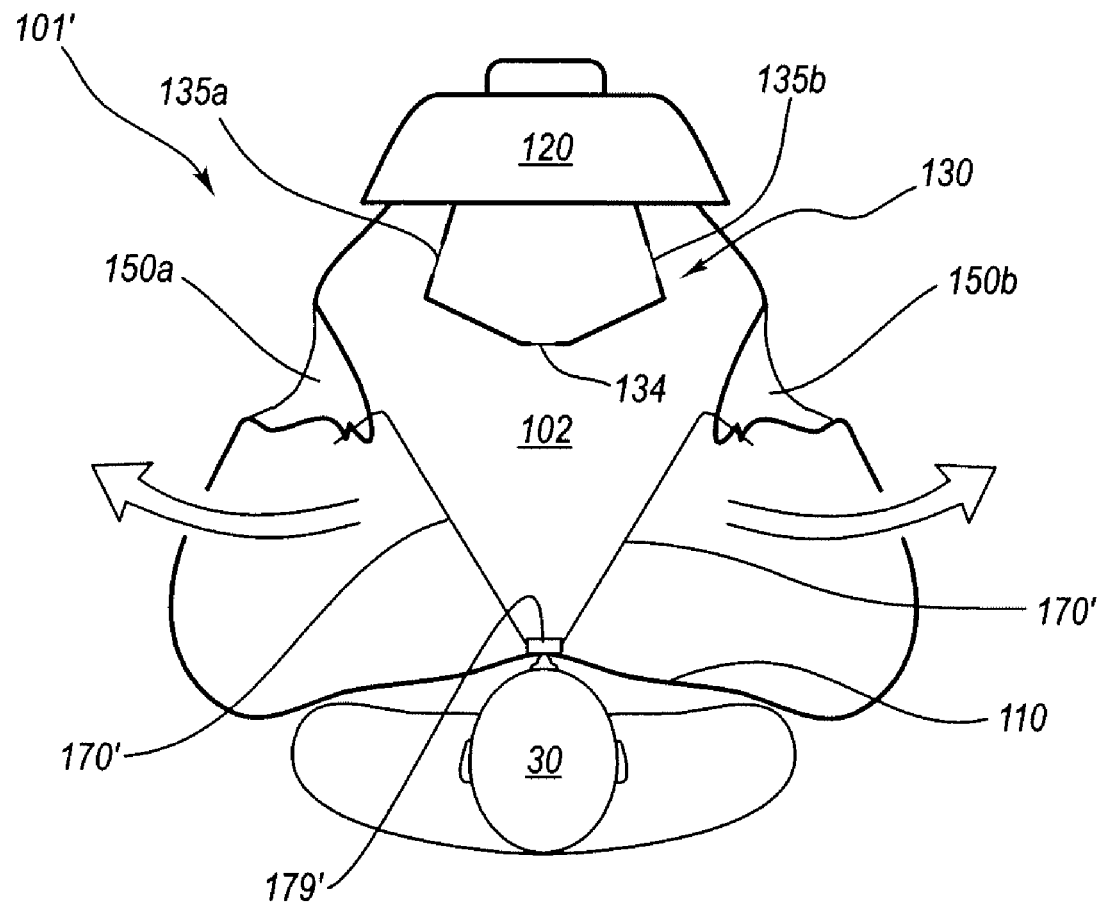
FIG. 6 is a cross-sectional view of an alternative embodiment of a deployed airbag cushion.

As described above, airbag cushion 101 includes a control tether 170. Each tether has a vent portion 173 which is configured to actuate the closeable vent. Tether 170 is configured to move with the expansion of airbag cushion 101 to enable vent portion 173 to close closeable vent 150. One end of tether 170 is connected to vent 170 via stitching 171 and the other end is connected to cushion membrane 110 via a tether attachment 179 which is part of or extends from membrane 110 of airbag cushion 101. Tether attachment 179 serves as an anchor for an end of tether 170. In another embodiment, the tether attachment is stitching between cushion membrane 110 and tether 170. In another embodiment, tether 170 is an integral extension of either cushion membrane 110 or cinch tube 152. Alternatively, tether 170 is not fixedly anchored but is moveably anchored to cushion membrane 110 via tether attachment 179' as shown in FIG. 6 which is essentially a loop that permits movement of tether 170. Other components of another embodiment of a control tether are described with reference to FIG. 8. The tether attachment may be disposed elsewhere such as proximate to a different portion of interior surface 111. Alternatively, the tether attachment may be a portion of exterior surface 112. For example, the tether attachment may be at the bottom of the face surface 113, which is the surface of the airbag cushion directed to the occupant. Thus, tether 170 may extend through the interior 102 of the airbag cushion 101 or may be positioned exterior to the airbag cushion 101. The location of the tether attachment 179 depends on module deployment angle, vehicle interior geometry, and cushion fold type. The tether 170 may comprise a nylon material or other suitable material known in the art.

FIGS. 2A-2C provide a cross-sectional view of an airbag cushion 101 deploying from a housing 10. For illustrative purposes, a single closeable vent 150 is shown in FIGS. 2A-2C but airbag cushion 101 may include multiple vents to provide required +-venting capability as shown in other embodiments.

In FIG. 2A, the initially deploying airbag cushion 101 has a control tether 170 which is slack and the closeable cinch vent 150 remains open. Note the pre-folded configuration in FIG. 2A which is described in more detail with reference to FIGS. 9A-9B. In FIG. 2B, the tether 170 is pulled taut and the closeable vent 150 begins to close. In FIG. 2C, the tether 170 is completely taut and the closeable vent 150 is closed.

Figure 3A:
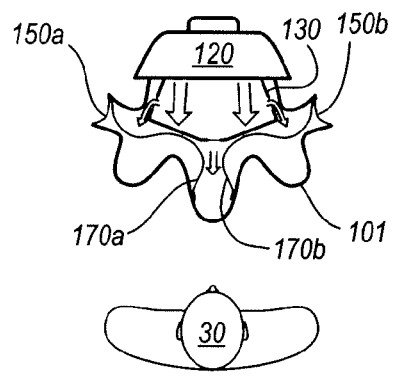
FIG. 3A is a cross-sectional view illustrating initial deployment of an airbag cushion for an occupant in a normal position.
Figure 3B:
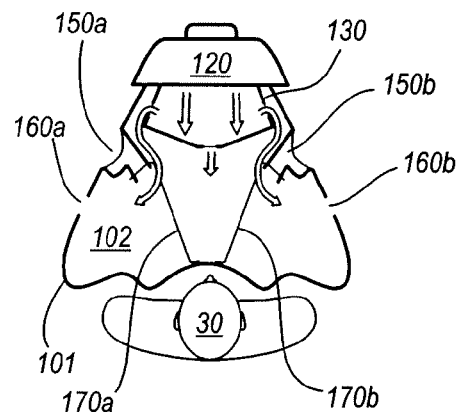
FIG. 3B is a cross-sectional view illustrating a deploying airbag cushion which is partially deployed as it encounters an occupant in a normal position.

Referring to FIGS. 3A and 3B, perspective views of one embodiment of a cinch vent 150 in both the open and closed positions are shown. Cinch tether 170 circumvents a majority of the perimeter of cinch tube 150 in order to properly tighten and restrict the cinch vent 150. Cinch tether 170 has a length that includes an initial free length and a circumference of cinch tube 150. Cinch tether 170 may be disposed within a sleeve 153 that is formed within cinch tube 152. Access to the sleeve 153 is through a sleeve aperture 154 formed in cinch tube 152. Cinch tether 170 enters sleeve aperture 154, feeds through sleeve 154, and is coupled at an end within sleeve 153 to cinch tube 152. Coupling may be achieved by stitches, bonds, adhesives, etc. FIG. 3B shows tether holder 153 gathered together so that rim 151 is collapsed on itself to close cinch tube 150.

Figure 3C:
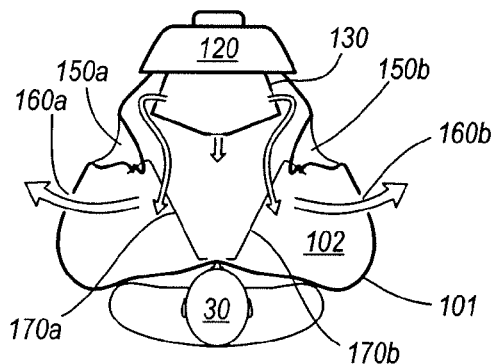
FIG. 3C is a cross-sectional view of an airbag cushion which has closed vents to enable the airbag cushion to fully deploy.

FIGS. 3A-C illustrate three stages of airbag cushion 101 deploying without encountering obstruction in the deploying path. The depicted airbag cushion 101 includes two closeable cinch vents 150a-b symmetrically disposed on the cushion 101 and two fixed vents 160a-b symmetrically disposed on the cushion 101. Fixed vents 160a-b provide consistent venting of the airbag cushion 101 and are not restricted by an occupant's position. In addition to remaining open, fixed vents 160a-b also differ from closeable vents 170a-b as fixed vents 160a-b are typically smaller. Fixed vents 160a-b may be optional in certain cushion embodiments based on venting requirements. The locations for closeable vents 150a-b and fixed vents 160a-b may vary as does the number of vents. An occupant 30 is in a normal seating position which will allow the airbag cushion 101 to fully expand before impacting the occupant. In this manner, the occupant 30 benefits from the full restraint capability of the airbag cushion 101.

In FIG. 3A, the initial breakout of the airbag cushion 101 occurs. The closeable cinch vents 150a-b are open and, in the depicted embodiment, extend from the airbag cushion 101. Because cushion 101 is initially in a folded condition, at initial breakout (such as the initial 7 milliseconds), closeable cinch vents 150a-b are initially non-functional. Because an occupant is not positioned directly in front of the airbag cushion 101 in FIG. 3A, cushion 101 unfolds and is allowed to pressurize normally. In FIG. 3B, tethers 170a-b which respectively correspond with cinch vents 150a-b are pulled taut and gas flow through cinch vents 150a-b is restricted. In FIG. 3C, cinch vents 150a-b are completely closed, the gas vents through the fixed vents 160a-b, and normal restraint is provided to the occupant 30.

Figure 4A:
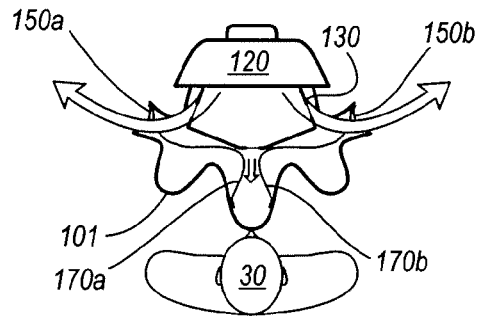
FIG. 4A is a cross-sectional view illustrating initial deployment of an airbag cushion for an out-of-position occupant.
Figure 4B:
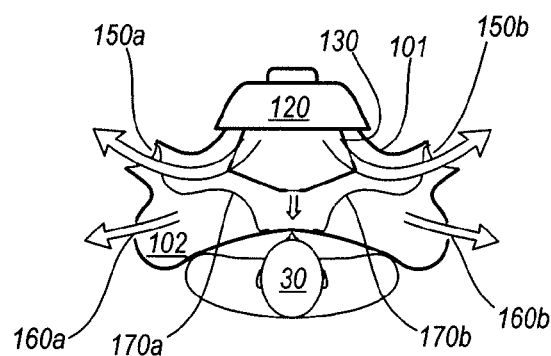
FIG. 4B is a cross-sectional view illustrating a deploying airbag cushion which is only partially deployed as it has encountered an out-of-position occupant.
Figure 4C:
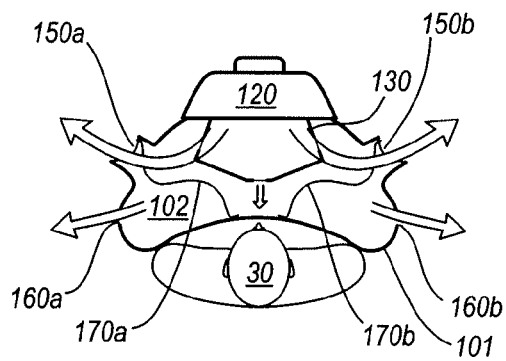
FIG. 4C is a cross-sectional view of an airbag cushion which remains only partially deployed as the closeable vents remain open to prevent full deployment of the airbag cushion.

FIGS. 4A-C illustrate three stages of a deploying airbag cushion 101 with obstruction in the deploying path. An occupant 30 is out-of-position and obstructs the deploying airbag cushion 101 and prevents the airbag cushion 101 from fully inflating. In FIG. 4A, airbag cushion 101 begins initial deployment as in FIG. 3A but encounters occupant 30 causing gas to be vented through fixed vents 160a-b. Fixed vents 160a-b may be located in the side panels of cushion 101 near closeable vents 150a-b, as shown. In FIG. 4B, airbag cushion 101 impacts the occupant 30 and the tethers 170a-b remain slack. The closeable vents 150a-b remain open and venting rapidly occurs from cinch vents 150a-b and fixed vents 160a-b. The cushion inflation is restricted and the occupant 30 receives less than the full deployment loading of the cushion 101. In FIG. 4C, cushion 101 is partially inflated and provides limited restraint. Venting continues through cinch vents 150a-b and fixed vents 160a-b.

Referring to FIG. 5, a graph illustrating venting as a function of airbag cushion displacement is shown. For reference, an airbag cushion 101 is shown in various stages of deployment with diffuser 130 and two symmetrically disposed cinch vents 150a-b. During initial deployment, airbag cushion 101 is unfolding and cinch vents 150a-b provide little or no venting. Airbag cushion 101 expands into an out-of-position zone where, if obstructed, the cinch vents 150a-b will remain completely or nearly open and full venting occurs. In this zone an occupant does not receive the full restraint capability but does benefit from limited restraint. If unobstructed, airbag cushion 101 expands into a gray zone where partial closure of the cinch vents 150a-b begins and venting is limited. If further unobstructed, airbag cushion 101 fully expands to the restraint zone. At this zone, cinch vents 150a-b completely close and an occupant benefits from the full restraint capability of airbag cushion 101.

Early in a normal inflation, gas loss through cinch vent 150a-b is minimal even with diffuser 130. This phenomenon is due to the Bernoulli effect—pressure is lower in a moving fluid than in a stationary fluid. For example, if the convex side of a spoon is placed into a smooth stream of water from a faucet, the spoon is pulled into the stream. The higher pressure outside the moving fluid pushes the spoon into the lower pressure water. In an airbag deployment, the high velocity stream of gas flowing into the cushion creates a similar effect for approximately 30 milliseconds, particularly in the area of throat 108. Since pressure outside the cushion is still atmospheric, there is a pressure imbalance and air flows into the cushion, not out of the cushion, when the vent is positioned alongside of the gas flow stream and not in its path.

Referring to FIG. 6, an another embodiment of an airbag cushion 101' is shown. Airbag cushion 101' includes two symmetrical closeable vents 150a-b that are embodied as described above and have been closed. Rather than having tethers corresponding to each closeable vent, a single tether 170' is used. Tether 170' is coupled to or engages each closeable vent in a manner similar to that previously described. Tether 170' passes through a tether attachment 179' which acts as a loop that is coupled to the interior surface 111 of airbag cushion 101. Tether attachment 179' may be formed of a fabric material similar or identical to that of the airbag cushion 101'. Tether 170' may freely pass through tether attachment 179' and may therefore be referred to as a "floating" tether. In an alternative embodiment, the tether may be disposed on the airbag cushion exterior and pass through a tether attachment coupled to an exterior surface 112 of the airbag cushion 101'. Note that upon deployment, the distance from the location of tether attachment 179' to throat 108 is greater than the distance from throat 108 to either closeable vent 150a' or 150b'.

Figure 7A:
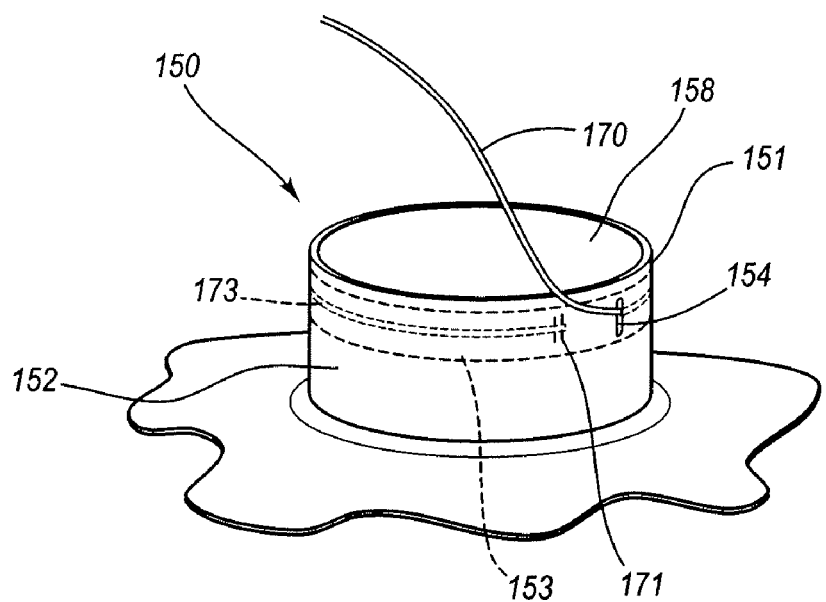
FIG. 7A is a perspective view of an embodiment of a cinch vent before the vent is closed.
Figure 7B:
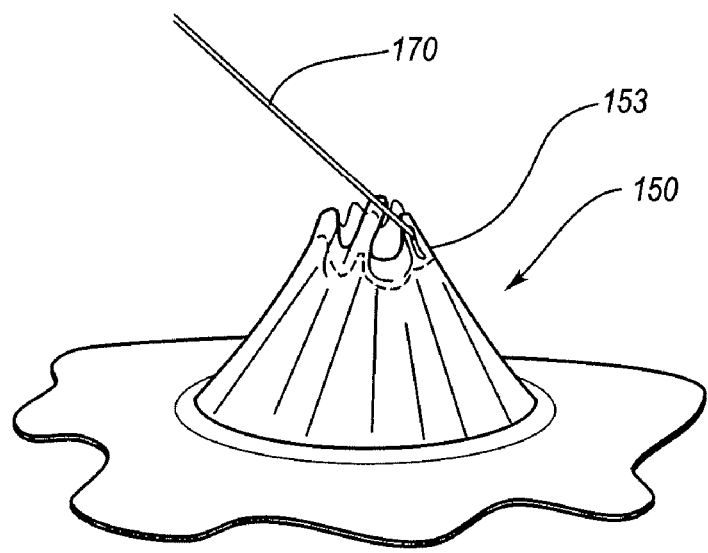
FIG. 7B is a perspective view of the embodiment of the cinch vent shown in FIG. 7A after the vent is closed.

Referring to FIGS. 7A-7B, cinch vent 150 is shown in more detail. Tether 170 has an end held by stitching 171 and a vent portion 173 around the majority of the perimeter of cinch tube 150'. Cinch tube 152 has a sleeve 153 which holds vent portion 173 of tether 170. Vent portion 173 enters sleeve 153 via sleeve aperture 154. As shown in FIG. 7B, sleeve 153 is gathered together when tether 170 has been pulled taut. By causing cinch tube 152, particularly rim 151, to collapse on itself, cinch vent 150 is closed. In other embodiments, sleeve 153 features numerous apertures to facilitate cinching or a plurality loops or tabs may collectively act as a tether holder. Optional tack stitching may be used to retain tether 170 and prevent inadvertent closing of the cinch vent 150 during shipping and handling. Such tack stitching is designed to be easily broken and provides no interference to airbag cushion deployment.

Figure 8:
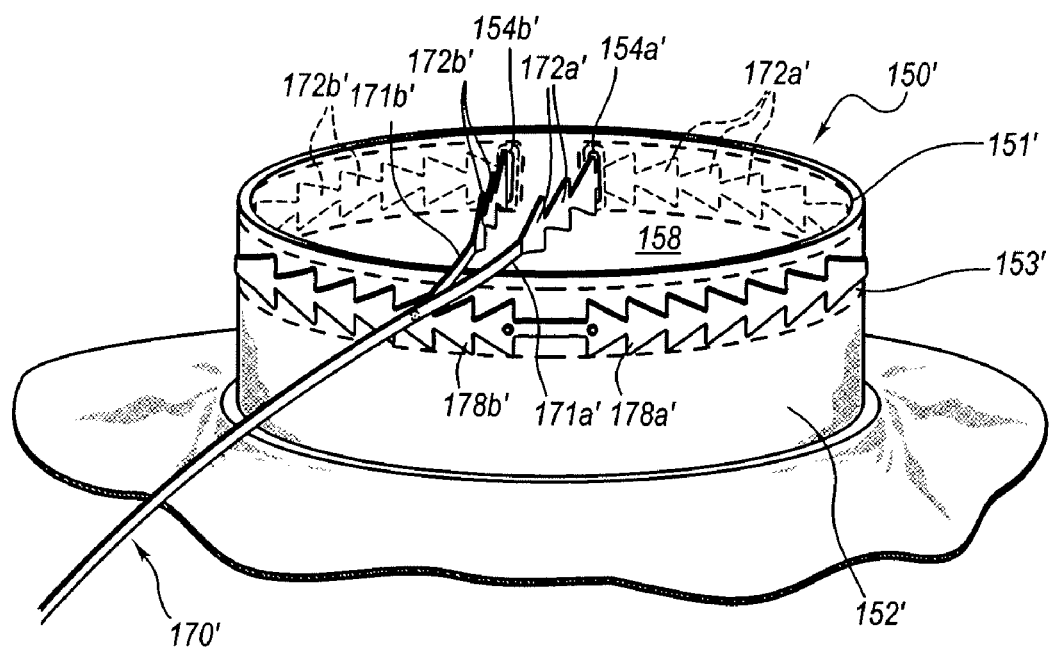
FIG. 8 is a perspective view of another embodiment of a cinch tube and a tether with multiple flat-wedged stoppers extending through two sleeve apertures to incrementally cinch the tube in two directions.

FIG. 8 depicts tether 170' which incrementally cinches in two directions. Cinch vent 150' is shown with a cinch tube 152 featuring apertures 154a'-b', which may be optionally reinforced. Tether 170' has stoppers 172a'-b'. During deployment, both sections 171a'-b' are respectively pulled through apertures 154a'-b' ensuring a positive lock of the sections of the disposed tether at apertures 154a'-b'. The stopper may have any suitable configuration such as a conical shape with a flared surface which terminates at a base configured to act as a brace surface. The depicted stoppers have a flat-wedged shape with opposing teeth 178' which is the region at the flared end of the stopper defined by the flared surface and the base. As each stopper 172 a'-b' passes through the respective sleeve aperture, cinch tether 170' is held in place and the diameter of cinch tube 152' is incrementally decreased. In operation, stoppers 172a'-b' prevent cinch tube 150' from reopening after deployment and closure of the cinch tube 150'. This may occur during deflation of an airbag cushion as the cinch tether becomes slack. Venting is thereby directed to other vents. These embodiments permit a positive lock of the cinch tether to be attained regardless of the amount of displacement of the tether through the sleeve of the cinch tube even at its maximum displaced position through the sleeve of the cinch tube. Of course, other embodiments of a tether with multiple stoppers can also be used to maintain cinch tube closure so that once closed or partially closed the cinch tube does not re-open.

Figure 9A:
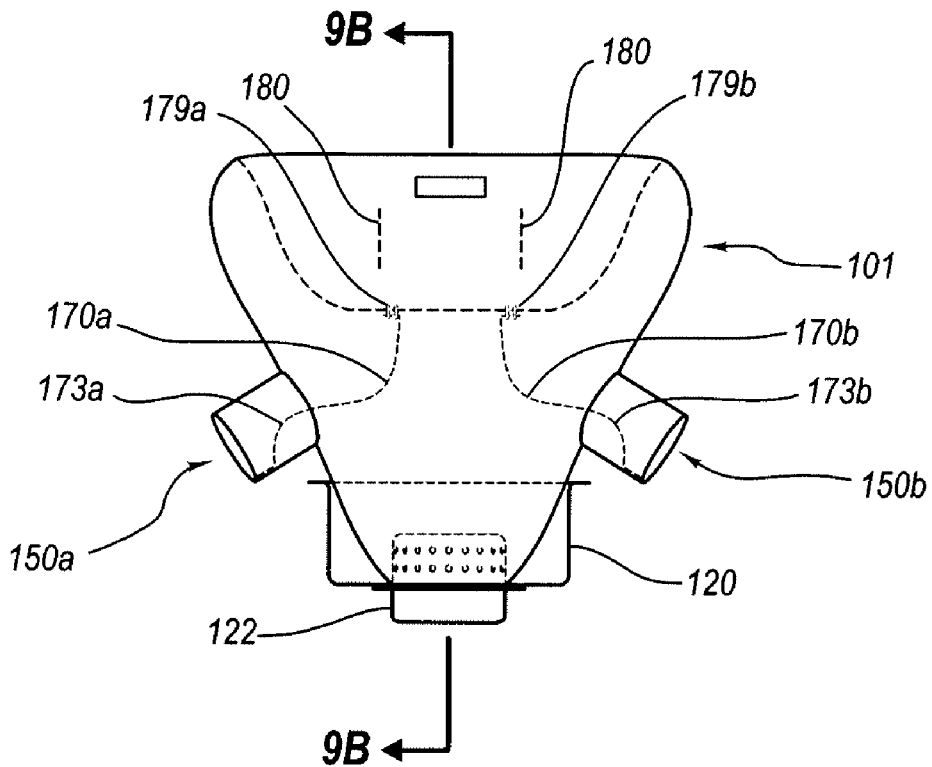
FIG. 9A is a top plan view of an airbag which has its front portion folded and held in place by breakaway stitching in preparation for being further folded for placement in an automobile.
Figure 9B:
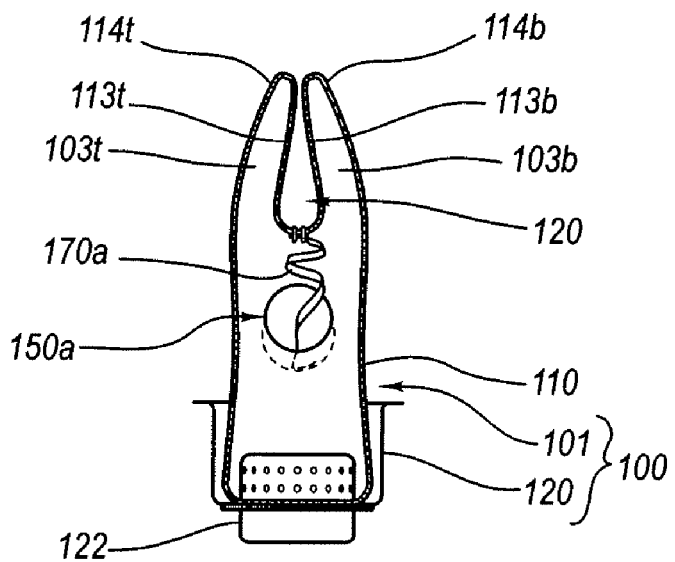
FIG. 9B is a cross-sectional view of the partially folded airbag shown in FIG. 9A with the front portion divided into a top section and a bottom section by a fold. The cross-sectional view is taken along cutting line 9B-9B in FIG. 9A.

FIGS. 9A-9B and FIG. 2A depict an airbag cushion 101 which has a fold 118 held initially by an optional tack stitch 180 that is advantageous to prevent undesired closure of the closeable vents during shipping or handling and to ensure that the tether remains slack during initial deployment of the airbag. Tack stitch 180 is designed to easily and consistently break during deployment and to provide no interference to airbag cushion deployment. While only a single fold is shown, other embodiments may have more than at least one fold.

The region of membrane 110 where tethers 170a-b extend from membrane 110 is tucked inside the main body of airbag cushion 101. Fold 118 has a base 119 which, as shown in FIG. 9B, may corresponds with the location of the tether attachment(s). After tack stitch 180 ruptures and the folded portion of membrane 110 at fold 118 unfolds as shown in FIG. 2A, tethers 170a and 170b move from a slack condition to a tensioned condition. Then, as discussed above with reference to FIGS. 2B-2C, tethers 170a and 170b become fully tensioned and close closeable vents 150a and 150b to enable airbag cushion 101 to become fully inflated in the absence of an out-of-position occupant blocking deployment.

Due to fold 118, front portion 102f of interior 102 is divided into a top section 103t and a bottom section 103b as shown in FIGS. 8A-8B and 9A. As also shown in FIGS. 8A-8B and 9A, a top section 113t and a bottom section 113b of face surface 113 are opposite each other when airbag cushion 101 is folded. FIGS. 8B and 9A also identify tips 114t and 114b which are opposite each other when airbag cushion 101 is folded but move away from each other as the airbag cushion 101 is inflated.

Other structures may also be used to ensure that tethers 170a and 170b remain initially slack during the early stages of the airbag deployment and remain loose during shipping and handling. Other examples of releasable temporary holding features which ensure that the tethers do not prematurely actuate the gas venting features include fasteners, adhesives, clips, knots, hook and loop fasteners, etc. Such releasable temporary holding features are examples of means for temporarily and releasably holding a portion of an airbag in a folded configuration.

FIGS. 10A-10B and FIGS. 11A-11B depict an airbag cushion 101" with another embodiment of a closeable vent. Closeable laced vents 150a"-150b" comprise opposing vent sides 152a"-152b". Opposing sides 152a"-152b" have holes 154a"-154b" which receive the vent portion 173a"-173b" of tether 170a"-170b" in a single laced configuration. The opposing sides 152a"-152b" come together at ends 156a"-156b". Sides 152a"-152b" are located around a vent aperture 158a"-158b" in the membrane 110 of the inflatable airbag cushion 101. Vent aperture 158a"-158b" is defined by edges 151a"-151b" of sides 152a"-152b". The closeable laced vent may be reinforced as needed with a suitable material such as a nylon woven fabric-type or other material known in the art. For example, optional panel strips may also be used to reinforce sides 152a"-152b" or a sleeve may be formed to assist in reducing surface tension when under pressure.

Closeable laced vents 150a"-150b" may be formed by cutting a slit in membrane 110 or by removing a portion of membrane 110. Closeable laced vents may also be formed which are co-linear with a seam of the airbag, such as seam 116 in FIG. 1 by not seaming the opposing portions of material together. The vent aperture of the closeable vent may have any suitable shape. Vent portions 173a"-173b" may also have other configurations. For example, vent portions 173a"-173b" may extend diagonally across vent apertures 158a"-158b" in a double laced configuration like a shoelace without retention knots 171a"-171b". Note that in such a double laced configuration, neither end of the control tether is necessarily attached to a closeable vent.

Airbag cushion 101" depicted in FIGS. 10A-10B and FIGS. 11A-11B has a fold 118 which is essentially identical to fold 118 depicted in FIG. 2A and FIGS. 9A-9B. Fold 118 airbag cushion 101" is also held initially by an optional tack stitch 180 to prevent undesired closure of the closeable vents during shipping or handling and to ensure that the tether remains slack during initial deployment of the airbag. The area of membrane 110 connected to tethers 170a"-170b" is tucked inside the main body of airbag cushion 101.

FIGS. 11A-11B shows airbag cushion 101" with front portion 102f of interior 102 divided into a top section 103t and a bottom section 103b. Top section 113t and a bottom section 113b of face surface 113 are opposite each other when airbag cushion 101 is folded. Tips 114t-114b which are opposite each other when airbag cushion 101 is folded, as shown in FIG. 11A, move away from each other as the airbag cushion 101 is inflated as shown in FIG. 11B.

Additional embodiments of an airbag cushion are shown in FIGS. 12A-16B at 201. Elements associated with airbag cushions 201, 201' and 201" are numbered similarly to the embodiments of the airbag cushions identified as 101 but are in the 200's. An embodiment of a partially deployed airbag cushion 201 is shown in various views in FIG. 12A and FIG. 13A with a flap vent 250 which is open and a control tether 270 which is slack. The same embodiment is shown fully inflated in FIG. 12A and FIG. 13A with flap vent 250 which has been closed and control tether 270 in a taut configuration. A second embodiment of flap vent 250' and a control tether 270' are provided in FIGS. 14A-4B and FIGS. 15A-5B. The second embodiment is shown with its flap vent 250' open in FIG. 14A and FIG. 15A and with its flap vent 250' closed in FIG. 14B and FIG. 15B. A third embodiment is shown in FIGS. 16A-6B. The closeable flap vents are closed when the control tethers have been pulled taut due to the expansion of the cushion which is caused by the pressure of the gas in the airbag cushion.

Figure 12A:
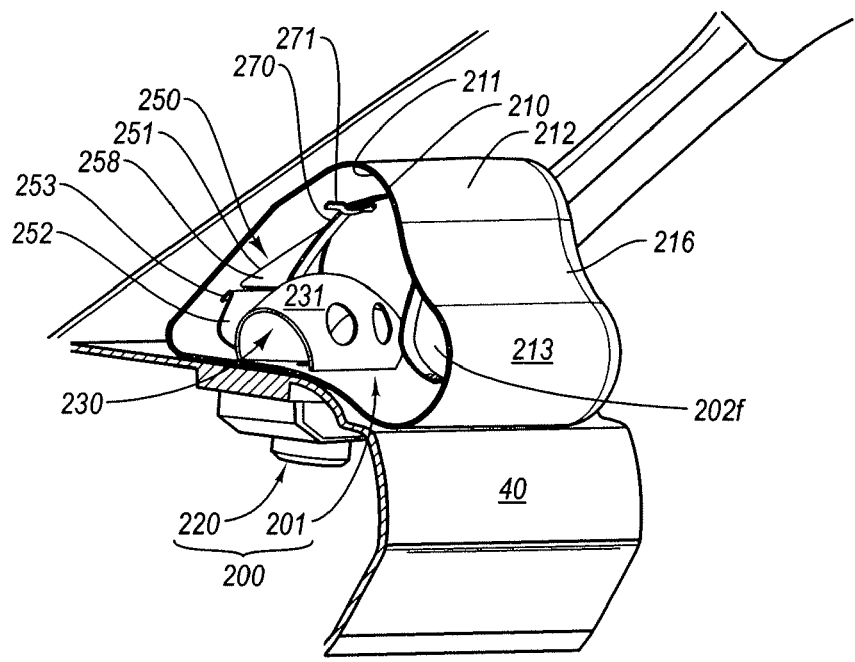
FIG. 12A is a perspective view of the partially deployed airbag cushion with a partial cut-away to show the open flap vent, tether and a diffuser.
Figure 12B:
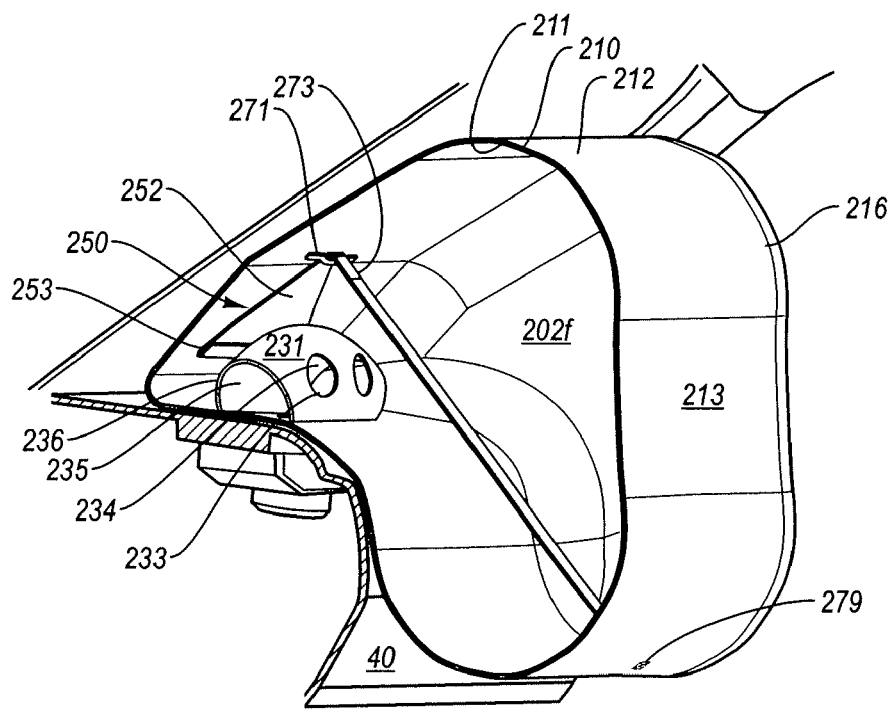
FIG. 12B is a perspective view of the fully deployed airbag cushion with a partial cut-away to show the closed flap vent, tether and a diffuser.

FIGS. 12A-12B provide cut-away, perspective views of airbag cushion 201 and instrument panel 40. In addition to airbag cushion 201, another component of airbag module 200 is also shown in FIGS. 12A-12B, airbag module housing 220, which is positioned under instrument panel 40. Another component of the airbag module is an inflator (not shown) which is housed within airbag module housing 220 to inflate airbag cushion 201 with inflation gas.

As mentioned above, airbag cushion 201 features a flap vent 250 which is controlled via a control tether 270. Another component is a diffuser 230. Each of these components are described in detail below.

Airbag cushion 201 has an interior 202 with a front portion 202f. As best seen in FIG. 13B, front portion 202f has a top section 203t and a bottom section 203b. Inflation gas passes from the inflator (not shown) and into interior 202 via a throat opening (shown only in FIGS. 16A-6B) in membrane 210 which is defined by a throat 208 (shown only in FIGS. 16A-6B). After passing through the throat opening, diffuser 230 directs the inflation gas within interior 202. As shown in FIG. 13B, top section 203t and bottom section 203b of front portion 202f significantly expands as airbag cushion 201 becomes fully deployed.

Membrane 210 has an interior surface 211 and exterior surface 212. The portion of the exterior surface facing the vehicle occupant is face surface 213. The various sections of membrane material are held together at seams 216. Of course, membrane 210 may also be formed from a single integral material.

Optional diffuser 230 is configured to create a pressure pocket and re-direct the inflation gas. The embodiment of the diffuser shown in the figures at 230 is pentagon shaped and comprises a material 231 which may be integral with cushion membrane 210 or attached to cushion membrane 210. For example, diffuser 230 may be sewn together with cushion membrane 210. Gas enters via a diffuser opening (not shown) which corresponds with the throat opening (shown only in FIGS. 16A-6B). Perimeter 233 defines forward openings 234. Forward openings 234 assist with normal inflation of cushion 200 to assist in getting cushion 200 in position in time for dynamic loading purposes. Each side opening 235 is respectively defined by a perimeter 236. Note that while only one side of the diffuser is shown, there is a side opening opposite the side opening shown at 235. The gas is directed out of forward openings 234 and side openings 235. Note that in other embodiments, the optional diffuser may have other shapes and the openings may have different sizes and numbers.

Side openings 235 may be strategically sized, as shown in FIG. 12B, relative to forward openings 234 to allow a greater volume to flow laterally than flows forward toward the occupant. This flow pattern enables airbag cushion 201 to inflate laterally at a quick rate while also partially inflating in a forward direction toward the occupant. In another embodiment, the diffuser may be configured to re-direct gas at the flap vent during at least a particular stage of deployment.

Closeable flap vent 250 is best seen in FIGS. 12A-12B. As shown in FIG. 12A, the edges of membrane 210 define a vent aperture 258 and are referred to as rim 251 or diameter of the vent aperture. Vent aperture 258 in membrane 210 provides an opening for gas to exit interior 202 of airbag cushion 201 when via closeable flap vent 250 is open. Flap 252 extends within interior 202 of airbag cushion 201. Flap 252 may be attached to cushion membrane 210 via a flap attachment 253 which in this embodiment is an anchor stitching. In another embodiment, the flap may integrally extend from the cushion membrane. Flap 252 has a configuration which enables it to close vent aperture 258 as shown in FIG. 12B. Flap 252 may have a shape which corresponds with the shape of vent aperture 258 and be sized slightly larger than vent aperture 258. In other embodiments, the flap may have a different shape but still be larger than the vent aperture. The flap and flap aperture may have any suitable shape such as round, elliptical, rectangular, triangular, or polygon shapes. The flap and flap aperture may have any size which enables the flap vent to close. The design permits the flap vent to be a low-stress element in the cushion assembly which is helpful during unfolding of the cushion and pressurization. The flap may comprise a nylon woven fabric-type or other suitable material known in the art. Note that the embodiments detailed herein have a single closeable vent for illustrative purposes. However, the airbag cushion 201 may include multiple vents to provide required +-venting capability.

Flap 252 may be connected to or integrally extend from control tether 270. Tether 270 has a portion which rides in tether holder 271 referred to herein as a vent portion 273. The vent portion may also include the flap and other adjacent features such as the flap attachment 253. Vent portion 273 is shown extending from the apex of triangular flap 252. Tether 270 is configured to move with the expansion of airbag cushion 201 to enable vent portion 273 to close closeable vent 250. As tether 270 passes through tether holder 271, flap 252 is lifted toward vent aperture 258. More particularly, flap 252 is moved until the apex of flap 252 is over the apex of vent aperture 258 so that vent 250 is closed. In the embodiment depicted in FIG. 12A, vent portion 273 has a length that is sufficient to allow vent 250 to remain in an open configuration during partial deployment. The tether may be much narrower than the flap or the width of the tether and the flap may be about the same.

Figure 13A:
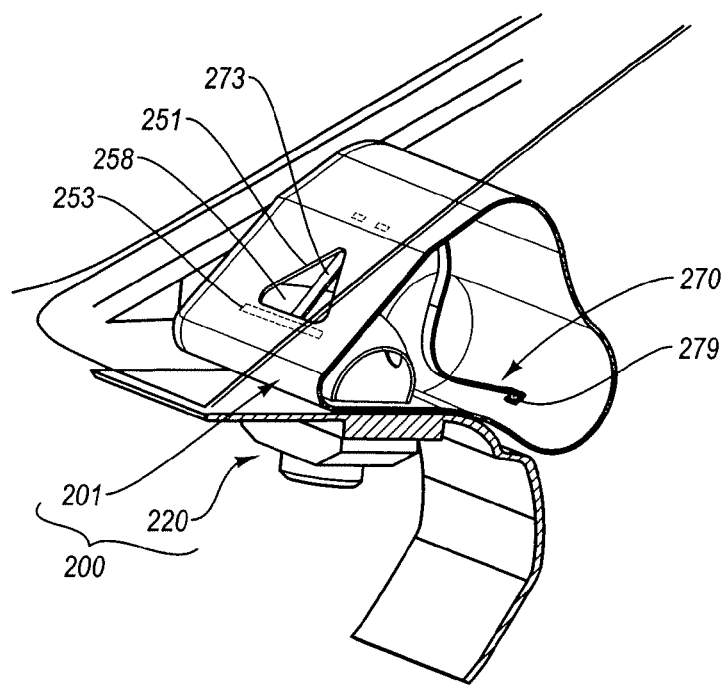
Figure 13B:
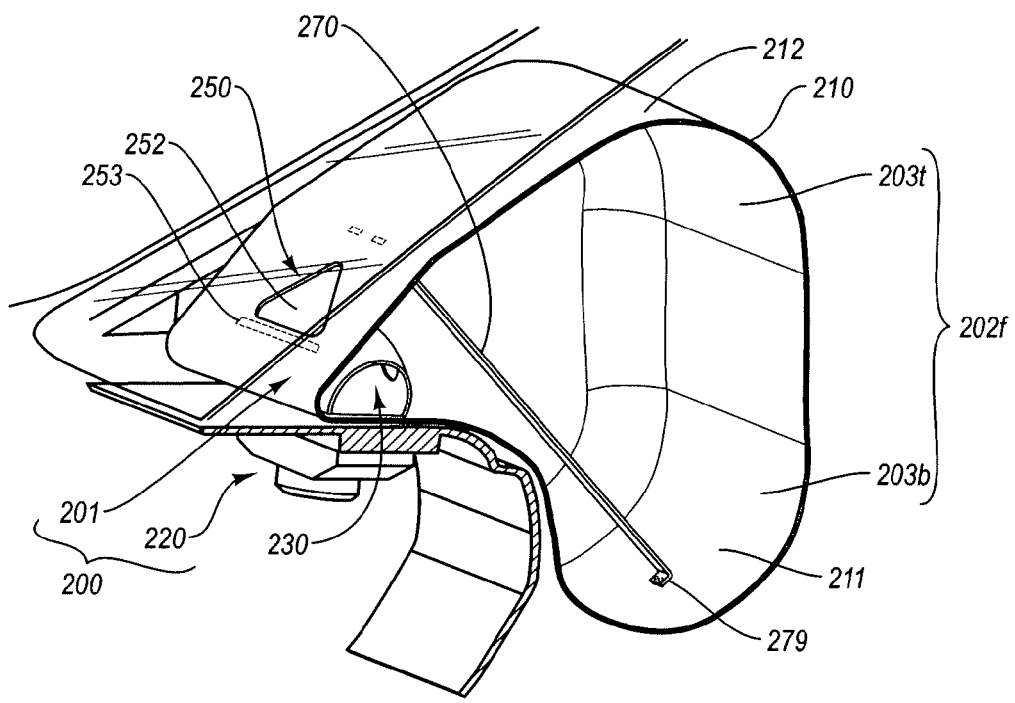

As shown in FIGS. 13A-13B, the end of tether 270 opposite from vent portion 273 is connected to cushion membrane 210 via a tether attachment 279. In this embodiment, tether attachment 279 is stitching between tether 270 and cushion membrane 210. While the depicted tether attachment serves as an anchor for an end of the tether, in another embodiment, the tether is not fixedly anchored but is moveably anchored to cushion membrane 210 via a tether attachment which is essentially a loop that permits movement of the tether. The tether attachment may be disposed elsewhere such as proximate to a different portion of interior surface 211. Alternatively, the tether attachment may be at exterior surface 212. For example, the tether attachment may be at the bottom of the face surface 213, which is the surface of the airbag cushion directed to the occupant. The location of the tether attachment 279 depends on module deployment angle, vehicle interior geometry, and cushion fold type. The tether 270 may comprise a nylon material or other suitable material known in the art. Tether attachment 279 may also be located at the base of a fold and the fold may be stitched together with an optional tack stitch as discussed above with respect to tack stitch 180.

Note that vent 250 is in close proximity to diffuser 230 and the throat (not shown) which is the opening for the gas to enter into airbag cushion 201. While only one vent is shown, in other embodiments two or more vents may be utilized to vent gas in a similar or identical way to vent 250. The closeable vent(s) may be located anywhere in the cushion membrane such as the sides or bottom. A closeable vent located in the windshield side, as shown, provides ample space for venting the inflation gas.

As best seen In FIG. 13A, the initially deploying airbag cushion 201 has a control tether 270 which is slack. In the initial breakout of airbag cushion 201, closeable flap vent 250 is open. Because cushion 201 is initially in a folded condition, at initial breakout (such as the initial 7 milliseconds), closeable flap vent 250 is initially non-functional. When an occupant is not positioned directly in front of the airbag cushion 201 in FIG. 13A, cushion 201 unfolds and is allowed to pressurize normally. If an occupant is in close proximity to airbag cushion 201 and restricts normal inflation, vent panel 250 remains open allowing inflation gas to escape. This configuration reduces the energy of the cushion and minimizes the risk of injury.

If an occupant is in a normal position and inflation is unrestricted, vent 250 is quickly closed as the cushion expands and gas is retained for normal occupant restraint. FIG. 13B provides the best view of tether 270 pulled taut so that the closeable vent 250 is closed.

Early in a normal inflation, gas loss through flap vent 250 is minimal even with diffuser 230. This phenomenon is due to the Bernoulli effect—pressure is lower in a moving fluid than in a stationary fluid. For example, if the convex side of a spoon is placed into a smooth stream of water from a faucet, the spoon is pulled into the stream. The higher pressure outside the moving fluid pushes the spoon into the lower pressure water. In an airbag deployment, the high velocity stream of gas flowing into the cushion creates a similar effect for approximately 30 milliseconds, particularly in the area of the throat. Since pressure outside the cushion is still atmospheric, there is a pressure imbalance and air flows into the cushion, not out of the cushion, when the vent is positioned alongside of the gas flow stream and not in its path. This phenomenon allows the vent to be in close proximity to the inflation source, as shown. Once cushion pressure begins to increase and gas flow from the inflator starts to tail off, the flap vent needs to be closed Fixed vents (not shown) which remain open may also be utilized in addition to a closeable vent to release gas. Such fixed vents provide restraint control and may be located anywhere in the cushion membrane such as in the side panels of the cushion membrane near the closeable vent. Fixed vents also provide consistent venting of airbag cushion 201 and are not restricted by an occupant's position. In addition to remaining open, fixed vents also differ from closeable vent 270 as the fixed vents are typically smaller. Fixed vents may be optional in certain cushion embodiments based on venting requirements. Like the locations for closeable vents, the location for fixed vents may vary as does the number of vents.

FIGS. 14A-4B and FIGS. 15A-5B depict another embodiment of an airbag cushion at 201'. More particularly, airbag cushion 201' features another embodiment of a flap vent and a tether as identified respectively at 250' and 270'.

Figure 14A:
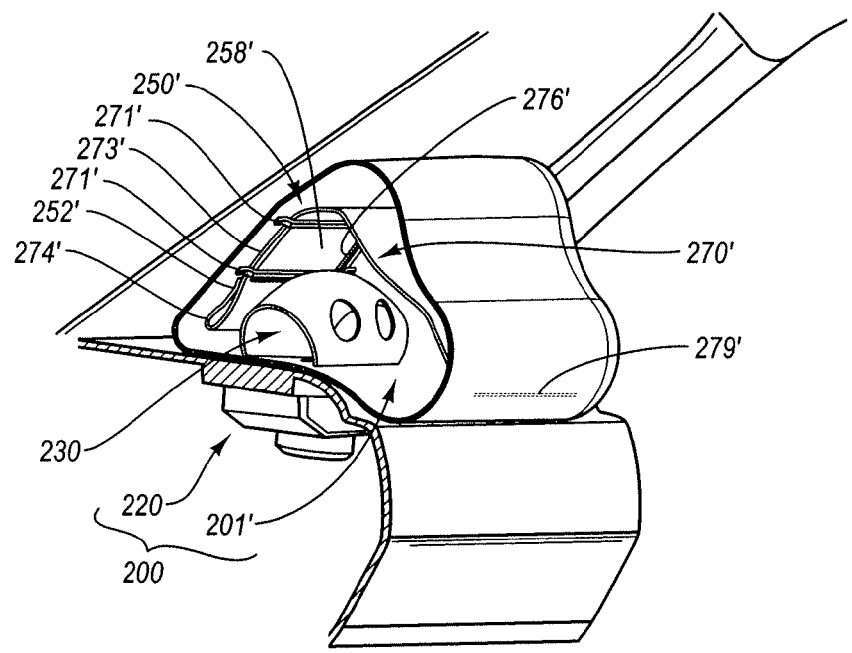
FIG. 14A is a perspective view of another embodiment of an airbag cushion with a partial cut-away to show the open flap vent, tether and a diffuser.
Figure 14B:
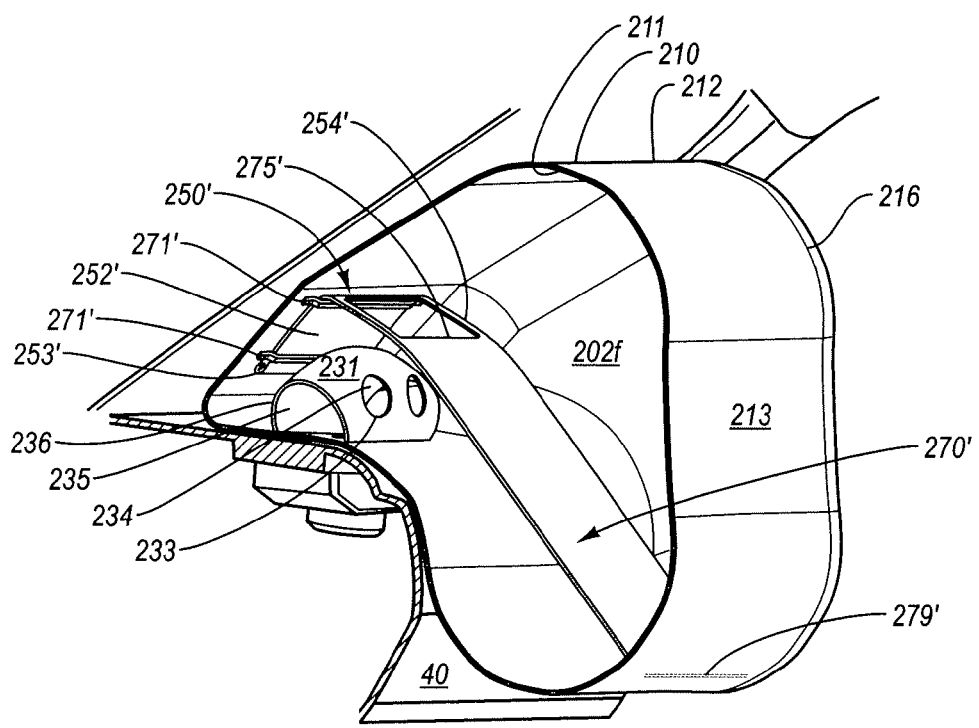
FIG. 14B is a perspective view of the embodiment of the airbag cushion shown in FIG. 14A with a partial cut-away to show the closed flap vent, tether and a diffuser.
Figure 15A:
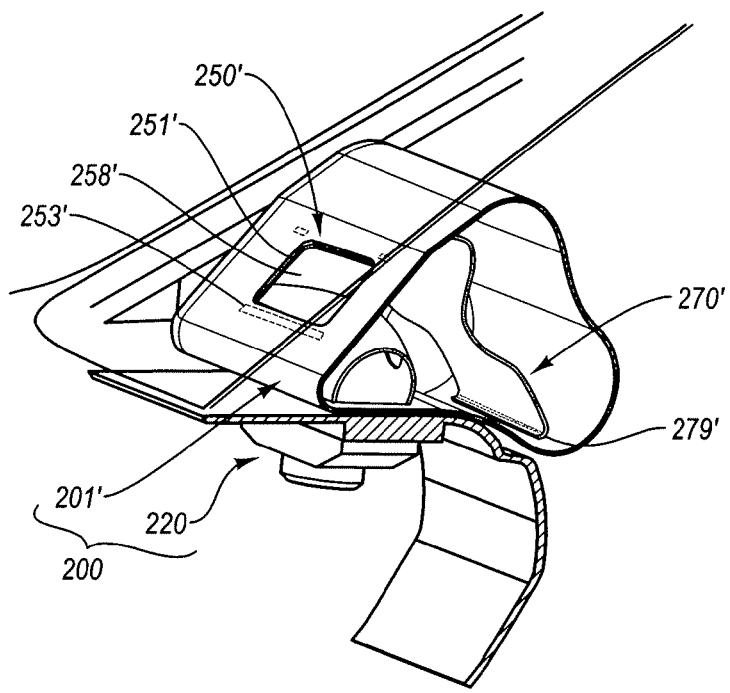
FIG. 15A is a perspective view of the partially deployed airbag cushion shown in FIG. 14A which shows the interior of the partially deployed airbag from the rear to the front as opposed to the front-to-rear view provided in FIG. 14A.
Figure 15B:
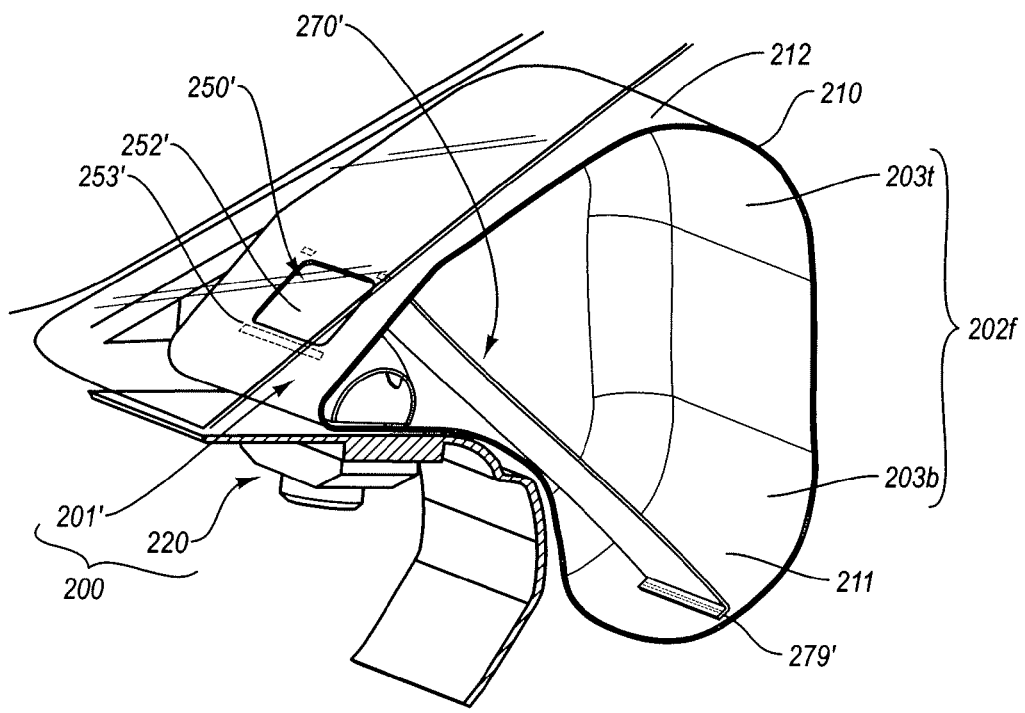
FIG. 15B is a perspective view of the fully deployed airbag cushion shown in FIG. 14B which shows the interior of the fully deployed airbag from the rear to the front as opposed to the front-to-rear view provided in FIG. 14B.

As best seen in FIG. 15A, closeable flap vent 250' has a vent aperture 258' defined by a rim or diameter of edges 251' which has a quadrilateral configuration. As shown in FIG. 14A, flap opening 254' is initially aligned with vent aperture 258' to permit venting. When an obstruction is encountered, flap opening 254' and vent aperture 258' remain aligned. When there is no obstruction, airbag cushion 201' fully inflates as shown in FIG. 14B which causes control tether 270' to become taut. The movement of control tether moves flap 252' into alignment with vent aperture 258' to prevent venting from occurring. Flap 252' has a quadrilateral configuration which is shaped like vent aperture 258'. Flap 252' is essentially a rectangular flap section as it is an integral extension of tether 270'. Of course, the flap may also be attached to the tether at the vent portion. Flap attachment 253 has a configuration which securely anchors flap 252' to cushion membrane 210. As shown in FIG. 14A, flap opening 254' is defined by side frames 256' on its sides and a top edge 275' opposite from a bottom edge.

Like airbag cushion 200, flap 252' of airbag cushion 200' generally matches the shape of vent aperture 258' but is larger to permit a sealing effect. As the control tether 270 pulls flap vent 250 closed, loading is transmitted primarily along the outer edges of flap 252' to flap attachment 253'. This creates a desirable perimeter tension that prevents flap 252' from being forced by internal pressure out of vent aperture 258'. Preventing flap 252' from extending out of vent aperture 258' avoids a large leak from occurring.

Two tether holders 271' are used to hold vent portion 273' of control tether 270'. So a single tether holder may be used as shown in airbag cushion 200 or a plurality of tether holders may be used. The tether holder may also have other configurations. For example, the tether holder may be simply two slits in the cushion membrane. Tether 270' further differs from tether 270 as it has a width that is the same as flap 252.

Figure 16A:
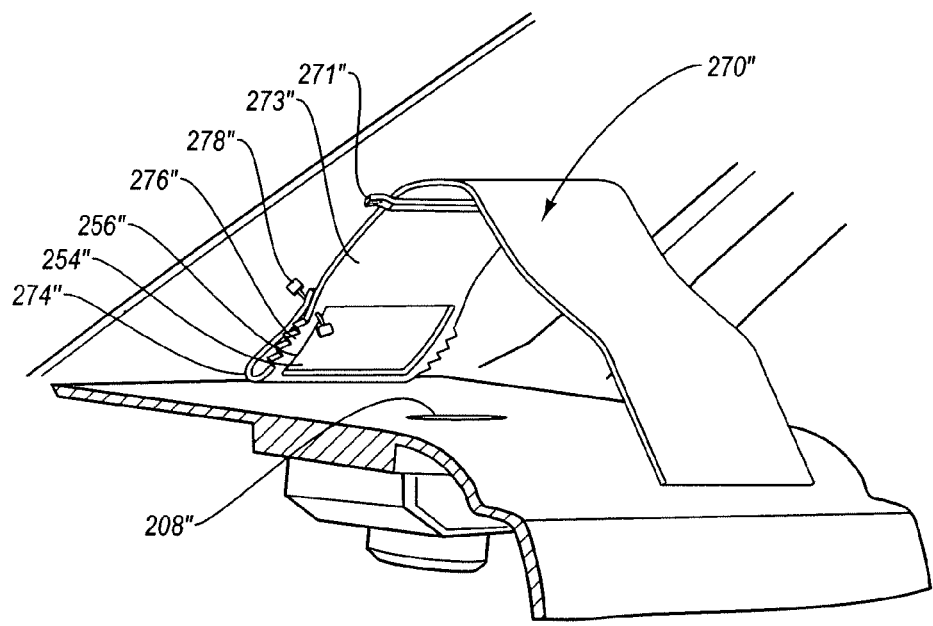
FIG. 16A is an enlarged perspective view of another embodiment of an airbag cushion with a partial cut-away to show the flap vent, tether and the throat for entry of the inflation gas from the inflator into airbag cushion.
Figure 16B:
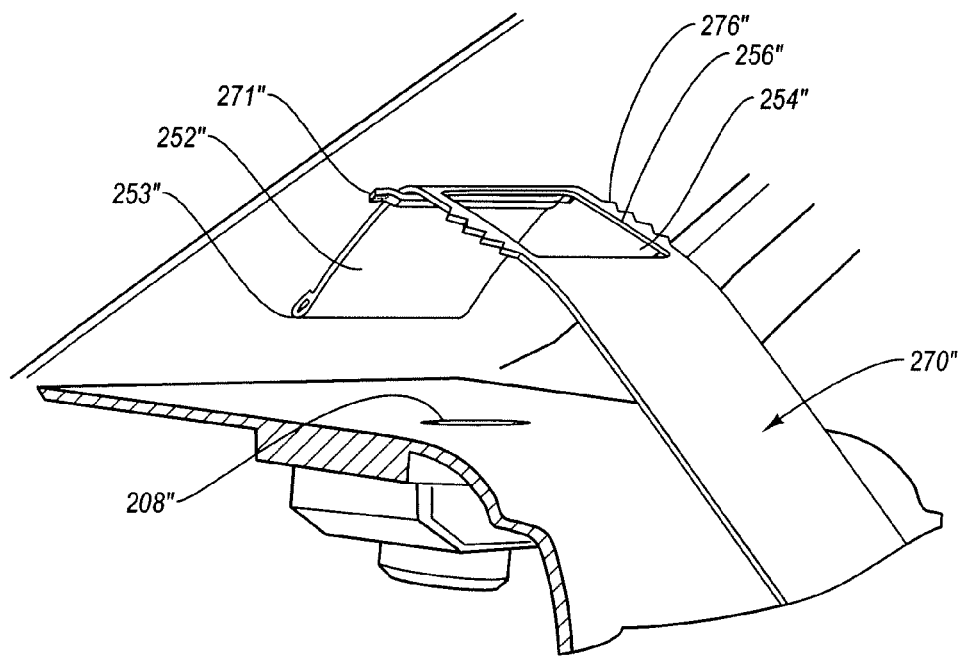
FIG. 16B is an enlarged perspective view of the embodiment of the airbag cushion shown in FIG. 16A with a partial cut-away to show the closed flap vent, diffuser and the throat of the airbag cushion.

FIGS. 16A-6B provide an enlarged perspective views of another embodiment of an airbag cushion. Unlike the other embodiments, there is not a diffuser in the airbag cushion so inflation gas enters the interior of airbag cushion directly via the throat opening defined by throat 208". In contrast with the embodiment depicted in FIGS. 14A-4B and FIGS. 15A-5B, flap vent 250" is initially closed as a segment of vent portion 273" blocks venting of gas via vent aperture (not shown in FIGS. 16A-6B).

Vent portion 273" has a flap 252 and a flap opening 254" which are held in a fold 274" by a temporary holding feature 278. The particular temporary holding feature is a plastic fastener much like those used to hold price tags to clothing.

While only a single fold is shown, other embodiments may have more than at least one fold. Temporary holding features may also be used with the other embodiments. For example, it may be useful for a temporary holding feature to be used to retain the control tether and prevent inadvertent closing of the flap vent during shipping and handling and to ensure that the tether remains slack during initial deployment of the airbag. Another example of a temporary holding feature is tack stitching which is designed to be easily broken and provides no interference to airbag cushion deployment. Other examples of releasable temporary holding features include adhesives, clips, hook and loop fasteners, knots, etc. Such releasable temporary holding features are examples of means for temporarily and releasably holding a portion of an airbag in a folded configuration.

Vent portion 273" also has teeth 276" which permit the vent portion to advance within tether holder 271" and become locked. After a pair of teeth 276" pass through tether holder 271", it is not possible for the pair to move backwards. While a plurality of pairs are shown, a single pair of teeth could also be utilized.

Figure 17C:
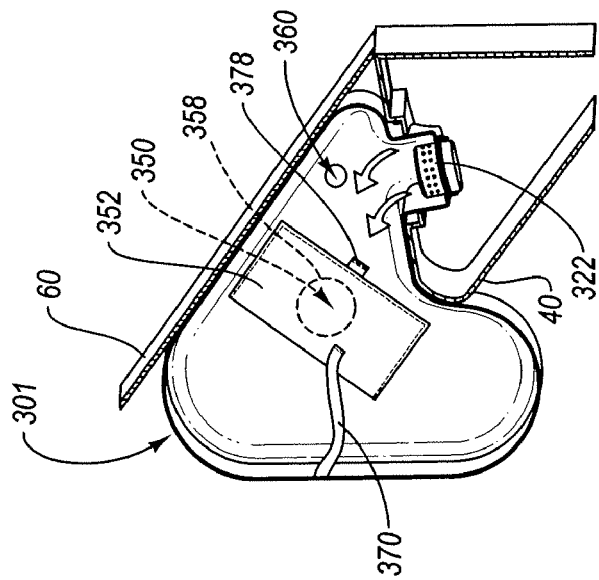
FIGS. 17A-17C depict an airbag incorporating another embodiment of a vent during unobstructed deployment.
Figure 17B:
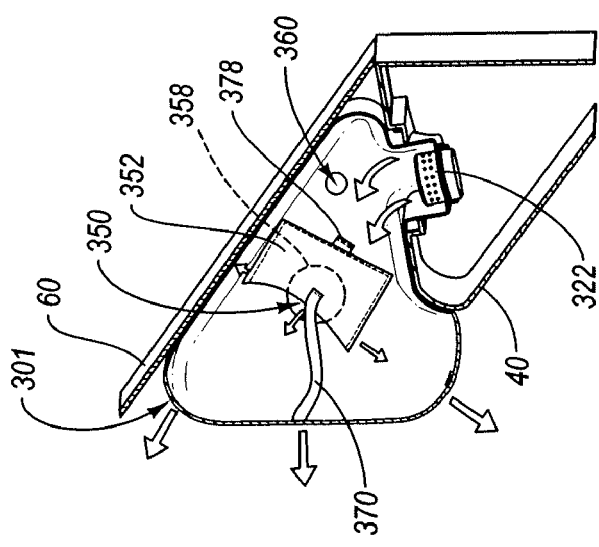
Figure 17A:
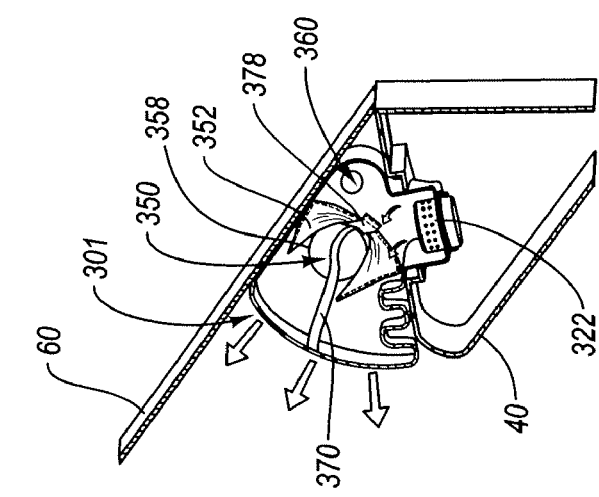

Another embodiment of an airbag cushion is shown in FIGS. 17A-17C and FIGS. 18A-18C at 301. Elements associated with airbag cushion 301 are numbered similarly to the embodiments of the airbag cushions identified as 101 and 201 but are in the 300's. In FIG. 17A, control tether 370 has not yet been fully extended. In other words, control tether 370, which is attached to the air bag cushion 301 at one end and to a temporary holding feature or tieback structure 378 at the other end, continues to have some slack at this point. Vent cover 352 is therefore held back and vent 350 is open. At the stage of deployment shown in FIG. 17B, control tether 370 has been stretched taut and has transmitted tension to the tieback structure 378 to thereby disengage the tieback structure 378 from the vent cover 352. Vent cover 352 in FIG. 17B is therefore in the process of covering vent aperture 358 of vent 350 to prevent or at least impede the escape of inflation gas therethrough. In FIG. 17C, vent cover 352 has covered cushion vent 350 and airbag cushion 301 is shown fully inflated.

The control tether may interact with the tieback structure in a variety of ways. By way of illustration and not limitation, the control tether may be configured such that it is integrally connected with a tieback structure at one end. In such an embodiment, the end of the control tether comprising the tieback structure may be configured to wrap around the vent cover and then be releasably attached to the airbag body and, optionally, releasably attached to itself as well. Alternatively, the control tether could be separate from, but connectable to, the tieback structure. In these embodiments, the control tether may be attached to—and may facilitate disengagement of—the tieback structure by hooks, snaps, adhesives, loops, stitching, or any other suitable structure. Optionally, the tieback structure may include one or more weakened, frangible, scored, or perforated portions to further facilitate releasing of the vent cover in cooperation with the control tether. Any of the aforementioned structures should be considered tieback means for holding the vent cover either away from the cushion vent opening or in a position such that a smaller portion of the cushion vent is covered than is covered in the cushion vent's unconstrained state and for releasing the vent cover once the body has expanded a sufficient amount to enable the vent cover to at least partially cover the cushion vent.

Figure 18A:
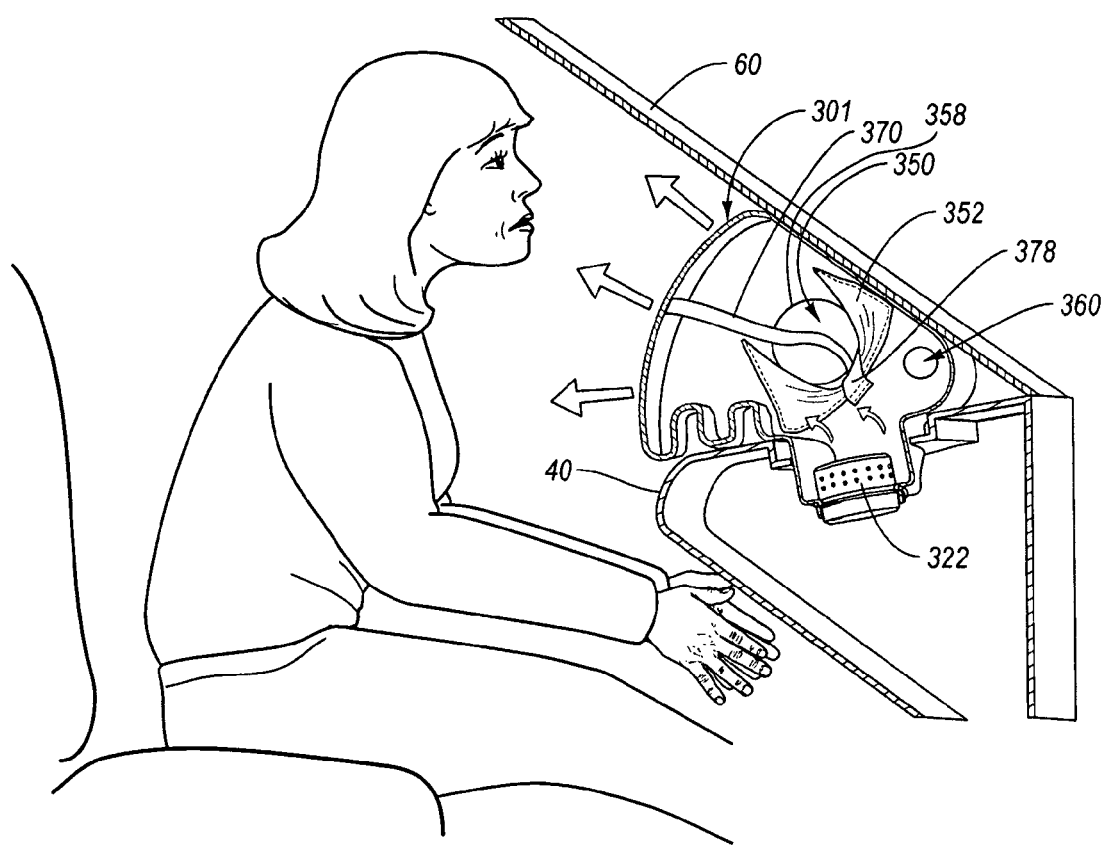
FIGS. 18A-18C depict an airbag as shown in FIGS. 17A-17C during deployment with an out-of-position occupant adjacent thereto.
Figure 18B:
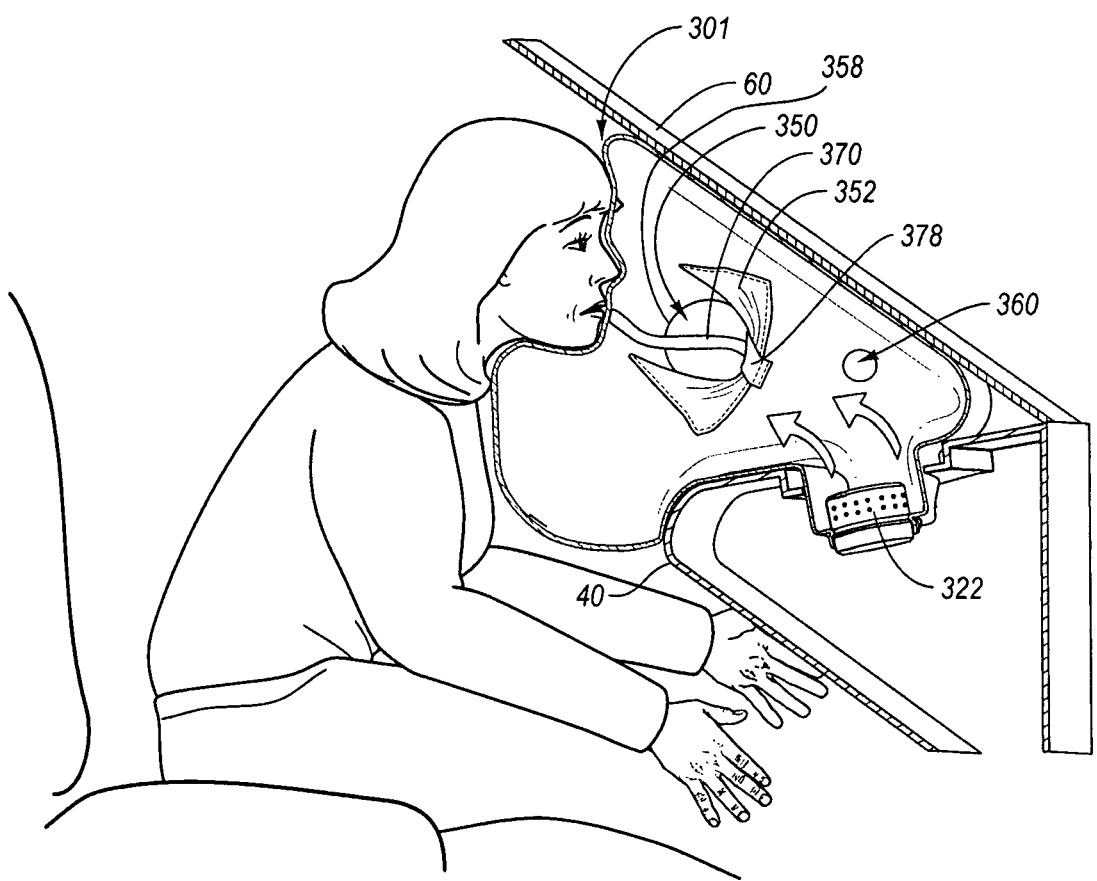
Figure 18C:
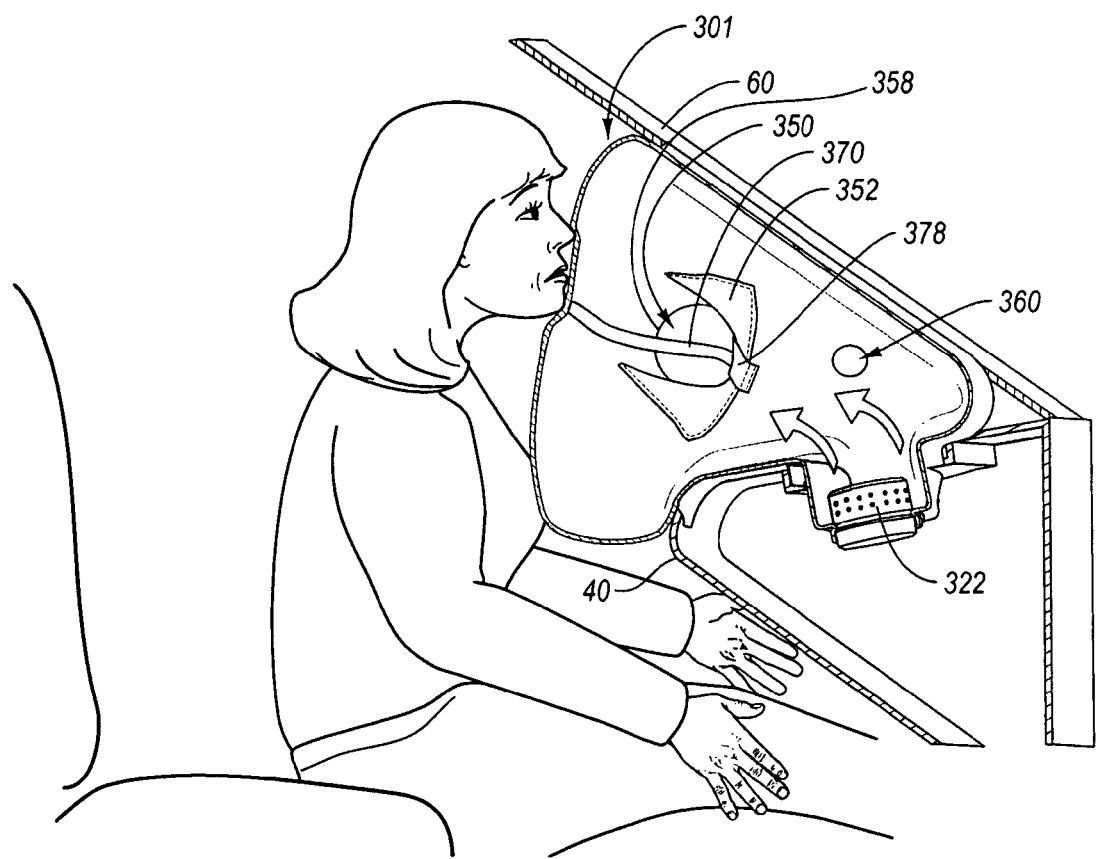

In FIGS. 18A-18C, the embodiment of the airbag system shown in FIGS. 17A-17C is shown during deployment with an out-of-position occupant adjacent thereto. FIG. 18B is a depiction of a deployment at about the same point in time as that of FIG. 17B relative to deployment initiation. However, in FIG. 18B, the out-of-position occupant's head has made contact with the airbag body. The presence of the out-of-position occupant thus prevents the control tether 370 from fully extending and thereby prevents the control tether from disengaging the tieback structure 378 from the vent cover 352. Because vent 350 remains open, inflation gas is free to exit therefrom and prevent full inflation of the airbag cushion 301. In this manner, the pressure and inflation forces on the out-of-position occupant are lessened and the risk for injury from the airbag deployment is reduced accordingly. The out-of-position occupant and the airbag system following complete deployment are shown in FIG. 18C.

Many design variations are possible and should be considered within the scope of the invention. For example, the airbag cushion body may have a plurality of cushion vents formed therein and each of the cushion vents may have an associated vent cover attached to the body and an associated tieback structure. Control tethers may extend from each of the respective tieback structures to different portions of the airbag cushion body. As such, the length with which each of the control tethers extend from their respective tieback structures to the airbag cushion body may differ in accordance with design specifications.

Accordingly, the design could be tailored to adjust or fine tune the deployment and deployment forces in accordance with various occupant positions. The design could be tailored, for instance, to allow a small number of cushion vents to remain open in the event that an occupant is only slightly out of position, allow a greater number of cushion vents to remain open in the event that an occupant is further out of position, and allow most or all cushion vents to remain open in the event that an occupant is positioned very close to the airbag at the time of deployment. The design could also be tailored to account for a passenger being out of position laterally with respect to the airbag by configuring the control tethers to allow primarily the cushion vents on one side of the airbag cushion body or the other to remain open in accordance with the position of the out-of-position occupant.

Vent covers suitable for use in embodiments of the invention may be shaped and sized in a wide variety of ways as desired. Embodiments of the invention may also optionally include protruding features extending from the vent cover. Such features may be shaped and configured to interact with the gas flow and prevent "flutter" at high gas velocities. These protruding features need not be any particular shape or size. Instead, they may be shaped and sized in accordance with desired gas flow characteristics.

Embodiments disclosed herein illustrate novel techniques for venting an airbag cushion to retain an open vent when an occupant obstructs the path of a deploying cushion and to close and remain closed when an occupant does not obstruct a deploying cushion. Airbag cushions provide improved safety by deploying with less pressure when an occupant is obstructing deployment. The airbag cushions deploy with more pressure when an occupant is not obstructing deployment and when high pressure is required to provide the necessary restraint. The airbag cushions described herein have application to both driver and passenger based on design constraints. The vent may be closed by bring the rim of the vent together, at least partially closing the vent and without pulling the rim into the perimeter of the vent.

Various embodiments for closeable vents have been disclosed herein. The closeable vents disclosed herein are examples of means for venting gas out of the airbag. The closeable flap vents disclosed herein are examples of flap vent means for selectively venting gas out of the airbag. The flaps are examples of means for covering a vent aperture in the cushion membrane to vent gas out of the airbag.

A control cord or control tether, as disclosed herein, is an example of means for restricting gas venting by moving the covering means upon inflatable airbag deployment without obstruction and enabling the vent aperture to remain uncovered upon inflatable airbag deployment with obstruction. The control tether is also an example of means for restricting gas venting by closing the venting means upon inflatable airbag deployment without obstruction and enabling the venting means to remain open upon inflatable airbag deployment with obstruction.

The combination of a closeable vent and a control tether, as disclosed herein, is an example of means for restricting gas venting by closing the venting means to reduce the aperture of the venting means upon inflatable airbag deployment without obstruction and enabling the venting means to remain open upon inflatable airbag deployment with obstruction. The combination of a sleeve of a cinch tube and a cinch tether with a plurality of stoppers, as disclosed herein, is an example of means for restricting gas venting by incrementally cinching the venting means to reduce the circumference of the venting means upon inflatable airbag deployment without obstruction and enabling the venting means to remain open upon inflatable airbag deployment with obstruction.

The diffusers disclosed herein are examples of means for diffusing gas within an airbag cushion by re-directing inflation gas received from an inflator. The diffusers disclosed herein are also examples of means for diffusing gas by re-directing inflation gas to the venting means from an inflator such that the gas rapidly exits the inflatable airbag cushion via the venting means when deployment of the airbag is obstructed.

It will be apparent to those having skill in the art that changes may be made to the details of the above-described embodiments without departing from the underlying principles of the invention. Embodiments of the invention in which an exclusive property or privilege is claimed are defined as follows. Note that elements recited in means-plus-function format are intended to be construed in accordance with 35 U.S.C. § 112 ¶6.

The invention claimed is:

1. An airbag module, comprising:
an inflatable airbag cushion comprising a cushion membrane which defines an interior of the inflatable airbag cushion;
at least one closeable vent comprising a cinch tube having a base end opposite from a terminal end, wherein the terminal end has a rim that defines an aperture; and
a tether connected to the terminal end of the cinch tube at a first end in a configuration that permits the aperture of the cinch tube to be closed by cinching the rim together, and anchored to the cushion membrane at a second end,
wherein upon deployment of the inflatable airbag cushion with obstruction, the tether does not fully extend and the vent remains open, and upon deployment of the inflatable airbag cushion without obstruction, the inflatable airbag cushion fully inflates and moves the second end of the tether so that the tether is taut and fully extended to its maximum length thereby pulling on the first end of the tether to close the aperture at the terminal end of the vent by cinching the rim together, and
wherein full inflation of the inflatable airbag cushion creates a cushion membrane tension, and wherein the vent is configured such that the rim of the aperture is brought together by movement of the tether to close the vent without having to overcome resistance from the cushion membrane tension around the vent.

2. The airbag module of claim 1, wherein the tether closes the aperture at the terminal end of the vent without drawing the rim into the interior of the inflatable airbag cushion.

3. The airbag module of claim 1, wherein the tether is anchored to the cushion membrane via a tether attachment.

4. The airbag module of claim 1, wherein the tether is fixedly anchored to the cushion membrane.

5. The airbag module of claim 1, wherein the tether is moveably anchored to the cushion membrane.

6. The airbag module of claim 1, wherein the tether is initially prevented from closing the vent by a temporary holding feature.

7. The airbag module of claim 1, further comprising a diffuser configured to re-direct inflation gas to the closeable vent from an inflator such that the gas rapidly exits the inflatable airbag cushion via the closeable vent when deployment of the airbag is obstructed.

8. The airbag module of claim 1, further comprising a fixed vent disposed on the airbag and adapted to vent gas during airbag deployment with and without obstruction.

9. An airbag module, comprising:
an inflatable airbag cushion comprising a cushion membranes which defines an interior of the inflatable airbag cushion;
at least one closeable vent comprising a cinch tube having a base end opposite from a terminal end, wherein the terminal end has a rim that defines an aperture,
wherein the closeable vent extends outwardly relative to the interior of the airbag cushion prior to any inflation of the airbag cushion such that the base end is closer to the interior than the terminal end; and
a tether connected to the rim of the terminal end of the cinch tube at a first end in a configuration that permits the aperture of the cinch tube to be closed by cinching the rim together and wherein the tether is anchored to the cushion membrane at a second end,
wherein upon deployment of the inflatable airbag cushion with obstruction, the tether does not fully extend and the vent remains open, and upon deployment of the inflatable airbag cushion without obstruction, the inflatable airbag cushion fully inflates and moves the second end of the tether so that the tether is taut and fully extended to its maximum length thereby pulling on the first end of the tether to close the aperture at the terminal end of the vent by cinching the rim of the aperture together, and
wherein full inflation of the inflatable airbag cushion creates a cushion membrane tension, and wherein the vent is configured such that the rim of the aperture is brought together by movement of the tether to close the vent without having to overcome resistance from the cushion membrane tension around the vent.

10. The airbag module of claim 9, wherein the tether closes the aperture at the terminal end of vent without drawing the rim into the interior of the inflatable airbag cushion.

11. The airbag module of claim 9, wherein the tether is anchored to the cushion membrane via a tether attachment.

12. The airbag module of claim 9, wherein the tether is fixedly anchored to the cushion membrane.

13. The airbag module of claim 9, wherein the tether is moveably anchored to the cushion membrane.

14. The airbag module of claim 9, wherein the tether is initially prevented from closing the vent by a temporary holding feature.

15. The airbag module of claim 9, further comprising a diffuser configured to re-direct inflation gas to the closeable vent from an inflator such that the gas rapidly exits the inflatable airbag cushion via the closeable vent when deployment of the airbag is obstructed.

16. The airbag module of claim 9, further comprising a fixed vent disposed on the airbag and adapted to vent gas during airbag deployment with and without obstruction.

* * * * *